United States Patent
Han et al.

(10) Patent No.: US 11,510,001 B2
(45) Date of Patent: Nov. 22, 2022

(54) ELECTRONIC DEVICE AND METHOD FOR VOICE RECORDING IN ELECTRONIC DEVICE

(71) Applicant: Samsung Electronics Co., Ltd., Suwon-si (KR)

(72) Inventors: Taeyoung Han, Suwon-si (KR); Yongju Son, Suwon-si (KR); Sangheon Kim, Suwon-si (KR); Mira Seo, Suwon-si (KR); Byeongyeop Jang, Suwon-si (KR); Keunwon Jang, Suwon-si (KR); Jinwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/165,446

(22) Filed: Feb. 2, 2021

(65) Prior Publication Data

US 2021/0250683 A1    Aug. 12, 2021

(30) Foreign Application Priority Data

Feb. 10, 2020   (KR) .................... 10-2020-0015966

(51) Int. Cl.
*H04R 3/00* (2006.01)
*H04M 1/03* (2006.01)

(52) U.S. Cl.
CPC .............. *H04R 3/005* (2013.01); *H04M 1/03* (2013.01); *H04R 2201/025* (2013.01); *H04R 2499/11* (2013.01)

(58) Field of Classification Search
CPC .............. H04R 3/005; H04R 2201/025; H04R 2499/11; H04M 1/03

(Continued)

(56) References Cited

U.S. PATENT DOCUMENTS

2006/0019714 A1   1/2006   Lee et al.
2006/0067547 A1   3/2006   Le et al.
(Continued)

FOREIGN PATENT DOCUMENTS

CN   109462800 A    3/2019
EP   0 776 115 A2   5/1997
(Continued)

OTHER PUBLICATIONS

International Search Report dated May 25, 2021, issued in International Patent Application No. PCT/KR2021/001650.

(Continued)

*Primary Examiner* — William A Jerez Lora
(74) *Attorney, Agent, or Firm* — Jefferson IP Law, LLP

(57) ABSTRACT

An electronic device is provided. The electronic device includes a first housing structure including a first microphone, a second housing structure including a second microphone and foldably coupled to the first housing structure, a sensor module disposed in the first housing structure or the second housing structure, and a processor in the first housing structure or the second housing structure, operationally connected with the first microphone, the second microphone, and the sensor module, the processor configured to receive a folding event related to the first housing structure and the second housing structure through the sensor module while a specific voice recording mode is performed, identify folding state information in response to receiving the folding event, identify a recording function configuration related to the first microphone and the second microphone, based on the folding state information and the specific voice recording mode, and perform recording by applying the recording function configuration.

19 Claims, 37 Drawing Sheets

(58) Field of Classification Search
USPC .............................. 381/56, 58, 92, 341, 383
See application file for complete search history.

(56) References Cited

U.S. PATENT DOCUMENTS

| | | |
|---|---|---|
| 2010/0081487 A1 | 4/2010 | Chen et al. |
| 2010/0182265 A1 | 7/2010 | Kim et al. |
| 2011/0164105 A1* | 7/2011 | Lee .................. H04M 1/03 348/14.02 |
| 2012/0078624 A1 | 3/2012 | Yook et al. |
| 2013/0108066 A1 | 5/2013 | Hyun et al. |
| 2013/0109438 A1* | 5/2013 | Kwack .............. G06F 1/1647 455/566 |
| 2014/0105416 A1* | 4/2014 | Huttunen .......... H04R 5/027 381/92 |
| 2015/0055798 A1 | 2/2015 | Moon et al. |
| 2015/0141074 A1 | 5/2015 | Shim et al. |
| 2016/0295323 A1* | 10/2016 | Yliaho .............. H04R 29/005 |
| 2017/0229100 A1 | 8/2017 | Chun et al. |
| 2019/0007620 A1 | 1/2019 | Lei et al. |
| 2020/0021674 A1 | 1/2020 | Cheng |

FOREIGN PATENT DOCUMENTS

| | | |
|---|---|---|
| JP | 2002-186084 A | 6/2002 |
| KR | 10-2010-0098104 A | 9/2010 |
| KR | 10-2010-0035214 A | 4/2012 |
| KR | 10-2013-0048075 A | 5/2013 |
| KR | 10-2015-0024138 A | 3/2015 |
| KR | 10-2021-0099974 A | 8/2021 |
| WO | 2010/008418 A1 | 1/2010 |

OTHER PUBLICATIONS

European Office Action dated Jun. 28, 2021, issued in European Patent Application No. 21155492.8.

* cited by examiner

UNFOLDED STATE

FOLDED STATE

ELECTRONIC DEVICE AND METHOD FOR VOICE RECORDING IN ELECTRONIC DEVICE

CROSS-REFERENCE TO RELATED APPLICATION(S)

This application is based on and claims priority under 35 U.S.C. § 119(a) of a Korean patent application number 10-2020-0015966, filed on Feb. 10, 2020, in the Korean Intellectual Property Office, the disclosure of which is incorporated by reference herein in its entirety.

BACKGROUND

1. Field

The disclosure relates to an electronic device and a method for voice recording in an electronic device.

2. Description of Related Art

In line with an increasing degree of integration of electronic devices and a widespread use of super-fast/large-capacity wireless communication, a single electronic device (e.g., a mobile communication terminal) may recently be equipped with various functions. For example, not only a communication function, but also an entertainment function (e.g., gaming), a multimedia function (e.g., music/moving image playback), communication and security functions for mobile banking and the like, a scheduling function, and an electronic wallet function tend to be integrated in a single electronic device.

It has also become a recent trend to equip electronic devices with large-sized display panels such that users have no inconvenience in using such multimedia services. Moreover, foldable electronic devices equipped with flexible display panels have recently been disclosed. A foldable electronic device may refer to an electronic device including multiple housing structures which are configured to rotate with regard to each other.

The above information is presented as background information only to assist with an understanding of the disclosure. No determination has been made, and no assertion is made, as to whether any of the above might be applicable as prior art with regard to the disclosure.

SUMMARY

The foldable electronic device may include multiple housing structures, and each housing structure may include a microphone. The distance and direction between each of the multiple microphones included in the multiple housing structures of the foldable electronic device may vary depending on the angle by which the electronic device is unfolded.

It will be assumed, for example, that a foldable electronic device including multiple microphones is used for voice recording in an interview mode while the electronic device remains unfolded. If the electronic device is folded during the voice recording, the multiple microphones may be positioned in the same direction, thereby degrading the sound quality or aborting the recording.

Aspects of the disclosure are to address at least the above-mentioned problems and/or disadvantages and to provide at least the advantages described below. Accordingly, an aspect of the disclosure is to provide an electronic device and a method for recording a voice by the electronic device, wherein if the folding angle of the electronic device is changed while a voice is recorded in a specific voice recording mode, the configuration of the recording function can be changed to be appropriate to the corresponding state.

Additional aspects will be set forth in part in the description which follows and, in part, will be apparent from the description, or may be learned by practice of the presented embodiments.

In accordance with an aspect of the disclosure, an electronic device is provided. The electronic device includes a first housing structure including a first microphone, a second housing structure including a second microphone and foldably coupled to the first housing structure, a sensor module disposed in the first housing structure and/or the second housing structure, and a processor disposed in the first housing structure and/or the second housing structure and operationally connected with the first microphone, the second microphone, and the sensor module. The processor may be configured to receive a folding event related to the first housing structure and the second housing structure through the sensor module while a specific voice recording mode is performed, to identify folding state information in response to receiving the folding event, to identify a recording function configuration related to the first microphone and the second microphone, based on the folding state information and the specific voice recording mode, and to perform a recording operation by applying the identified recording function configuration.

In accordance with another aspect of the disclosure, a voice recording method of an electronic device is provided. The voice recording method of an electronic device includes a first housing structure including a first microphone and a second housing structure including a second microphone and foldably connected to the first housing, the voice recording method including the operations of receiving a folding event related to the first housing structure and the second housing structure through a sensor module while a specific voice recording mode is performed, identifying folding state information in response to receiving the folding event, identifying a recording function configuration related to the first microphone and the second microphone, based on the folding state information and the specific voice recording mode, and performing recording by applying the identified recording function configuration.

In accordance with another aspect of the disclosure, an electronic device is provided. The electronic device includes a first housing structure including a first microphone, a second housing structure including a second microphone and foldably coupled to the first housing structure, a sensor module disposed in the first housing structure and/or the second housing structure, and a processor disposed in the first housing structure and/or the second housing structure and operationally connected with the first microphone, the second microphone, and the sensor module. The processor may be configured to perform a recording operation by applying voice beamforming when a first voice recording mode is performed in an unfolded state of the electronic device, to receive a folding event related to the first housing structure and the second housing structure through the sensor module, to identify folding state information in correspondence to reception of the folding event, and to perform the recording operation without applying the voice beamforming when the electronic device is identified as being in a folded state as the result of identifying the folding state information.

According to various embodiments, even if the folding angle of a foldable electronic device is changed while the electronic device is used to record a voice in a specific voice recording mode, the configuration of the recording function may be changed to be appropriate to the corresponding state, thereby maintaining the continuity of the recording function.

It will be assumed, for example, that a foldable electronic device is used to record a voice in an interview mode while the electronic device is unfolded. Even if the electronic device changes to a folded state, thereby changing the relative position of microphones, the recording function configuration may be automatically changed, thereby providing a continuous and effective voice recording function.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
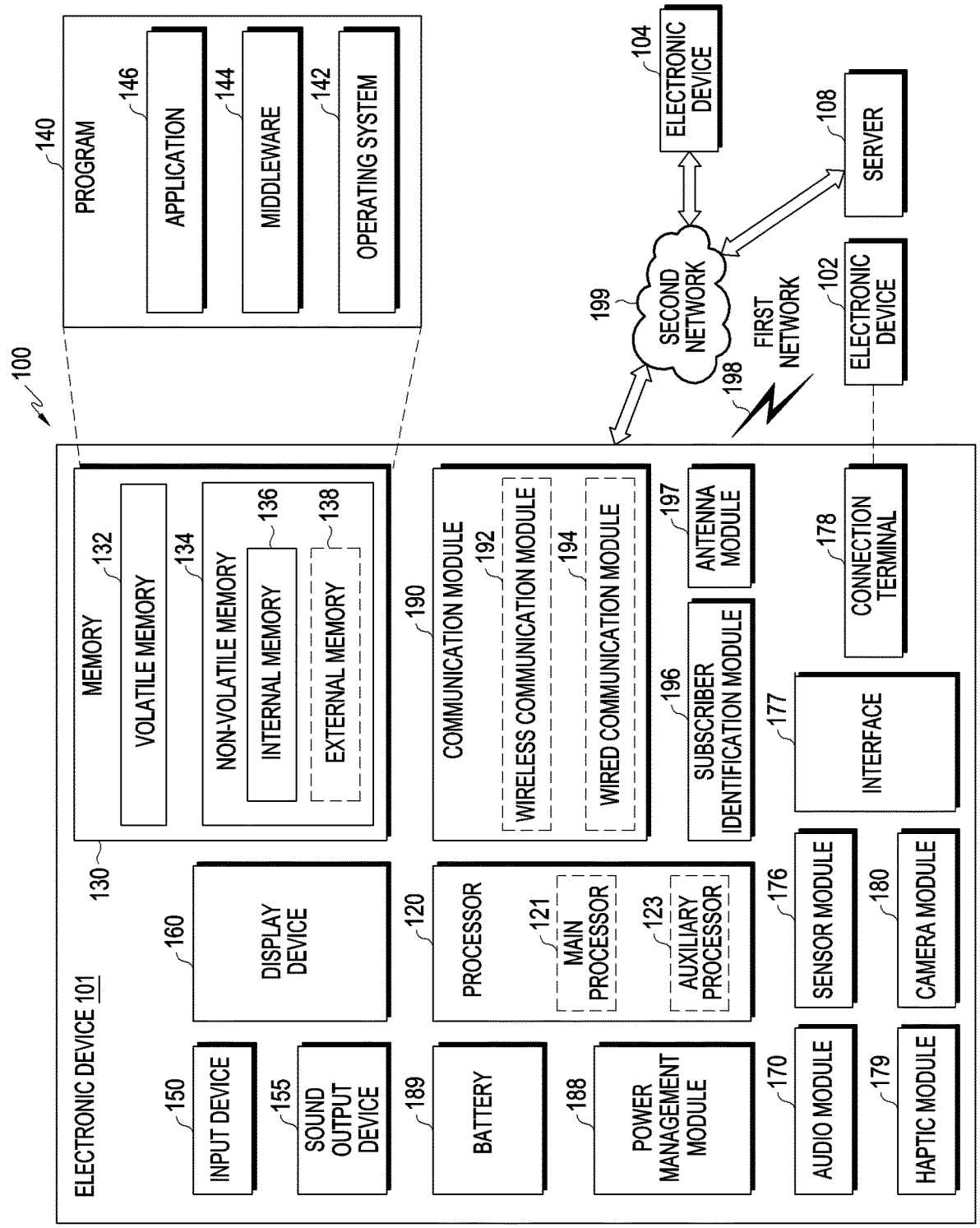
FIG. 1 is a block diagram of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, a singular expression used herein may include a plural expression unless they are definitely different in the context. As used herein, the expression "comprises", "include", or the like should not be interpreted to necessarily include all elements or all operations described in the specification, and should be interpreted to be allowed to exclude some of them or further include additional elements or operations.

The terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, embodiments of the disclosure will be described in detail with reference to the accompanying drawings. Regardless of drawing signs, the same or like elements are provided with the same reference numeral, and a repeated description thereof will be omitted. In describing the disclosure, descriptions related to technical contents well-known in the art and not associated directly with the disclosure will be omitted. Further, it should be noted that the accompanying drawings are presented merely to help easy understanding of the disclosure, and are not intended to limit the disclosure. The technical idea of the disclosure should be construed to cover all changes, equivalents, and alternatives, in addition to the drawings.

In the following, a mobile station will be described in the drawings, but the mobile station may be called an electronic device, a terminal, a mobile equipment (ME), a user equipment (UE), a user terminal (UT), a subscriber station (SS), a wireless device, a handheld device, an access terminal (AT). Further, the mobile station may be a device having a communication function, such as a mobile phone, a personal digital assistant (PDA), a smartphone, a wireless modem, or a notebook.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The non-volatile memory including an internal memory 136 and an internal memory 138. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
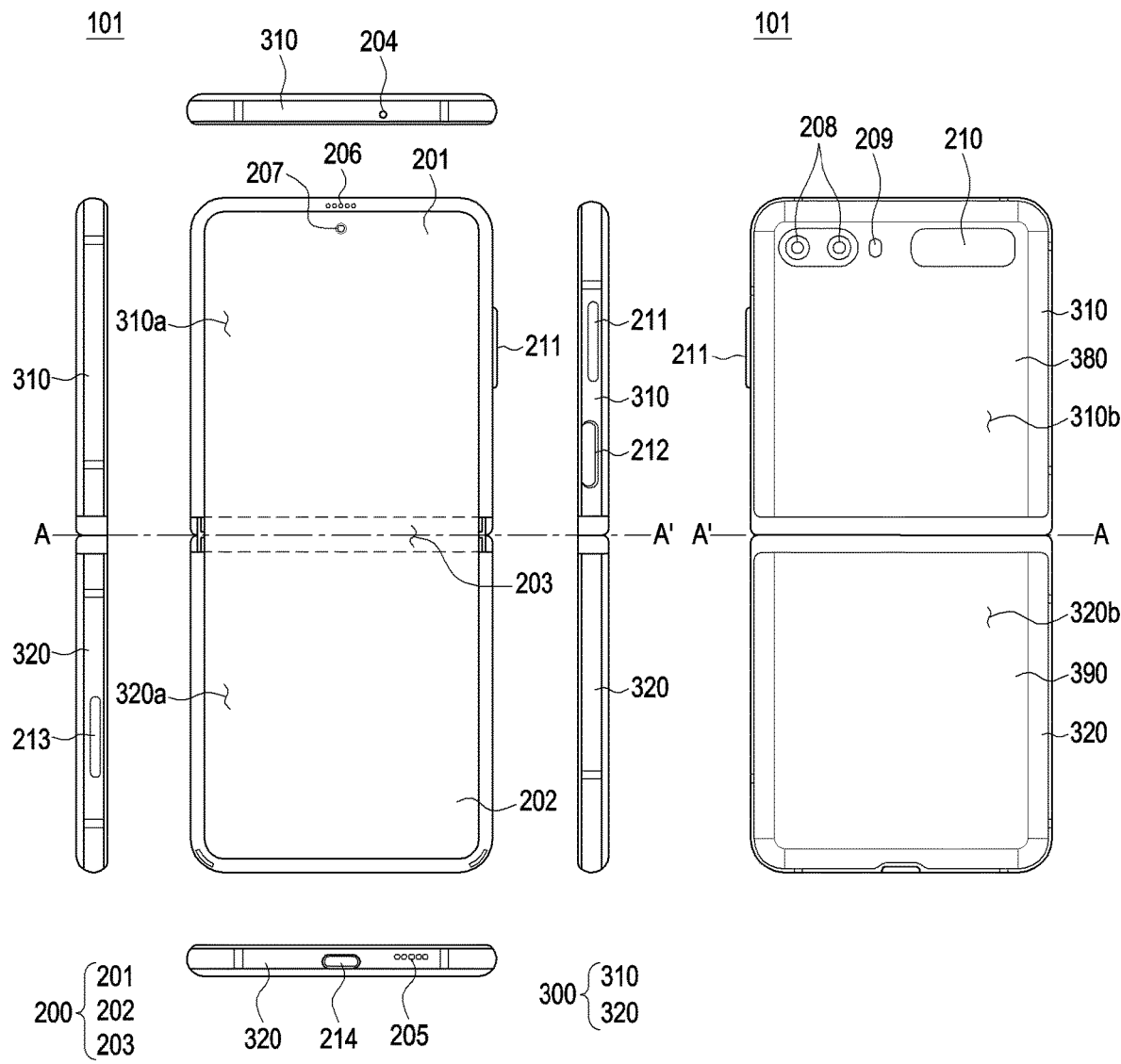
FIG. 2 is a view showing an unfolded state of an electronic device according to an embodiment of the disclosure.

FIG. 2 is a view showing an unfolded state of an electronic device according to an embodiment of the disclosure.

Various drawings showing the front surface, the rear surface, and the side surfaces of the electronic device 101 are shown in FIG. 2. FIG. 2 provides a cross-sectional view showing an unfolded state in which the display of the electronic device 101 according to an embodiment is fully unfolded or an intermediate state in which the electronic device is partially unfolded.

Referring to FIG. 2, the electronic device 101 according to an embodiment may include a foldable housing of the electronic device 300 and a flexible or foldable display 200 disposed in the space defined by the foldable housing of the electronic device 300 (hereafter, referred in abbreviation as 'display' 200 (e.g., the display device 160 of FIG. 1).

According to an embodiment, the surface on which the display 200 is disposed may be defined as the front surface of the electronic device 101. The front surface of the electronic device 101 may be at least partially substantially formed by a transparent front plate (e.g., a glass plate or a polymer plate including various coating layers). The opposite surface of the front surface may be defined as a rear surface of the electronic device 101. The rear surface of the electronic device 101 may be substantially formed by an opaque rear plate (hereafter, referred to as a 'rear cover'). The rear cover, for example, may be made of coated or colored glass, ceramic, a polymer, metal (e.g., aluminum, stainless steel (STS), or magnesium), or a combination of at least two of these materials. The surfaces surrounding the space between the front surface and the rear surface may be defined as sides of the electronic device 101. The side surfaces may be coupled to the front plate and the rear cover and may be formed by a lateral bezel structure (or a 'side member') including metal and/or a polymer. In an embodiment, the rear cover and the lateral bezel structure may be integrated and may include the same material (e.g., a metallic material such as aluminum).

The electronic device 101 may include at least one or more of a display 200, an audio module 204, 205, 206, a sensor module 209, camera modules 207 and 208, key input devices 211, 212, and 213, and a connector hole 214. According to an embodiment, the electronic device 101 may not include at least one (e.g., the key input devices 211, 212, and 213) of the components or may further include other components (e.g., a light emitting device).

According to various embodiments, the display 200 may be a display of which at least a partial region can be deformed into a flat surface or a curved surface. According to an embodiment, the display 200 may have a folding section 203, a first section 201 disposed at a side from the folding section 203 (e.g., over the folding section 203 shown in FIG. 2), and a second section 202 disposed at the other side (e.g., under the folding section 203 shown in FIG. 2). However, the divided sections of the display 200 shown in FIG. 2 are examples and the display 200 may be divided into a plurality of sections (e.g., four or more, or two sections), depending on the structure or the function. For example, the section of the display 200 can be divided by the folding section 203 or the folding axis A-A' in the embodiment shown in FIG. 2, but in another embodiment, the display 200 may be divided into sections by another folding section or another folding axis perpendicular to the folding axis (e.g., the folding axis A-A').

The audio module 204, 205, 206 may include a microphone hole 204 and speaker holes 205 and 206. A microphone for capturing external sounds may be disposed in the microphone hole 204, and in an embodiment, a plurality of microphones may be disposed therein to sense direction of sounds. The speaker holes 205 and 206 may include an external speaker hole 205 and a receiver hole 206 for a telephone call. In an embodiment, the speaker holes 205 and 206 and the microphone hole 204 may be integrated into one hole or a speaker (e.g., a piezo speaker) may be included without the speaker holes 205 and 206. The positions and numbers of the microphone hole 204 and the speaker holes 205 and 206 may be changed in various ways, depending on embodiments.

The camera modules 207 and 208 may include a first camera module 207 disposed on the first surface 310a of the first housing 310 of the electronic device 101 and a second camera module 208 disposed on the second surface 310b. The electronic device 101 may further include a flash (not shown). The camera modules 207 and 208 may include one or more lenses, an image sensor, and/or an image signal processor. The flash (not shown), for example, may include a light emitting diode or a xenon lamp.

The sensor module 209 can generate an electrical signal or a data value corresponding to the internal operation state of the electronic device 101 or an external environmental state. Though not shown in the figures, the electronic device 101 may additionally or alternatively include a sensor module for the sensor module 209 other than the sensor module 209 disposed on the second surface 310b of the first housing 310. The electronic device 101 may further include, as a sensor module, for example, at least one of a proximity sensor, a fingerprint sensor, an HRM sensor, a gesture sensor, a gyro sensor, a barometer sensor, a magnetic sensor, an acceleration sensor, a grip sensor, a color sensor, an IR (Infrared) sensor, a biosensor, a temperature sensor, a humidity sensor, or an illumination sensor.

The key input devices 211, 212, and 213 may be disposed on the side surfaces of the foldable housing of the electronic device 300. In another embodiment, the electronic device 101 may not include some or all of the key input devices 211, 212, and 213 described above and the non-included key input devices may be implemented in other types such as a software key on the display 200. In an embodiment, the key input devices may be configured such that key input is implemented by a sensor module.

The connector hole 214 can accommodate a connector (e.g., a USB connector) for transmitting and receiving power and/or data to and from an external electronic device, or additionally or alternatively, can accommodate a connector for transmitting and receiving an audio signal to and from an external electronic device.

According to various embodiments, the foldable housing of the electronic device 300 may include a first housing structure 310, a second housing structure 320, a first rear cover 380, and a second rear cover 390. The foldable housing of the electronic device 300 of the electronic device 101 is not limited to the type and combination shown in FIG. 2, and may be implemented by compounding and/or combining other shapes or parts. For example, in another embodiment, the first housing structure 310 and the first rear cover 380 may be integrally formed, and the second housing structure 320 and the second rear cover 390 may be integrally formed.

According to various embodiments, the first housing structure 310 may have a first surface 310a facing a first direction and a second surface 310b facing a second direction opposite to the first direction. The second housing structure 320 may have a third surface 320a facing a third direction and a fourth surface 320b facing a fourth direction opposite to the third direction. The electronic device 101 can be changed into a foldable state or an unfolded state, which will be described below with reference to FIGS. 7A through 8B. According to an embodiment, the first surface 310a may face the third surface 320a in a fully folded state of the electronic device 101, and the third direction may be the same as the first direction in a fully unfolded state.

According to various embodiments, the first housing structure 310 and the second housing structure 320 are disposed at both sides (or up and down) with the folding axis A-A' therebetween, and the entire shape is symmetric with respect to the folding axis A-A'. The angle or the distance between the first housing structure 310 and the second housing structure 320 may depend on whether the electronic device 101 is in the unfolded state or the folded state, or in an intermediate state in which the electronic device 101 is partially unfolded (or folded). According to an embodiment, the first housing structure 310, unlike the second housing structure 320, additionally includes various sensors, but they may have a symmetric shape in the other region.

According to various embodiments, the first rear cover 380 is disposed at a side of the folding axis A-A' on the rear surface of the electronic device 101 and, for example, may have a substantially rectangular periphery, in which the periphery may be surrounded by the first housing structure 310. Similarly, the second rear cover 390 is disposed at the other side of the folding axis A-A' on the rear surface of the electronic device 101 and the periphery thereof may be surrounded by the second housing structure 320.

According to various embodiments, the first rear cover 380 and the second rear cover 390 may have a substantially symmetric shape with the folding axis A-A' therebetween. However, the first rear cover 380 and the second rear cover 390 do not necessarily have a symmetric shape, and in another embodiment, the electronic device 101 may include a first rear cover 380 and a second rear cover 390 that have various shapes. In another embodiment, the first rear cover 380 may be formed integrally with the first housing structure 310, and the second rear cover 390 may be formed integrally with the second housing structure 320.

According to various embodiments, the first rear cover 380, the second rear cover 390, the first housing structure 310, and the second housing structure 320 may define a space in which various components (e.g., a printed circuit board or a battery) of the electronic device 101 can be disposed. According to an embodiment, one or more components may be disposed or visually exposed on the rear surface of the electronic device 101. For example, at least a portion of a sub-display 210 may be visually exposed through the first rear cover 380. In another embodiment, one or more parts or sensors may be visually exposed through the first rear cover 380. In various embodiments, the sensors may include a proximity sensor and/or a rear camera module. Further, though not specifically shown in the figures, one or more parts or sensors may be visually exposed through the second rear cover 390.

According to various embodiments, a front camera module 207 exposed on the front surface of the electronic device 101 through one or more openings or a rear camera module 208 exposed through the first rear cover 380 may include one or more lenses, an image sensor, and/or an image signal processor. A flash (not shown), for example, may include a light emitting diode or a xenon lamp. In an embodiment, two or more lenses (an infrared camera, a wide-angle lens, and a telephoto lens) and image sensors may be disposed on one surface of the electronic device 101.

Figure 3A:
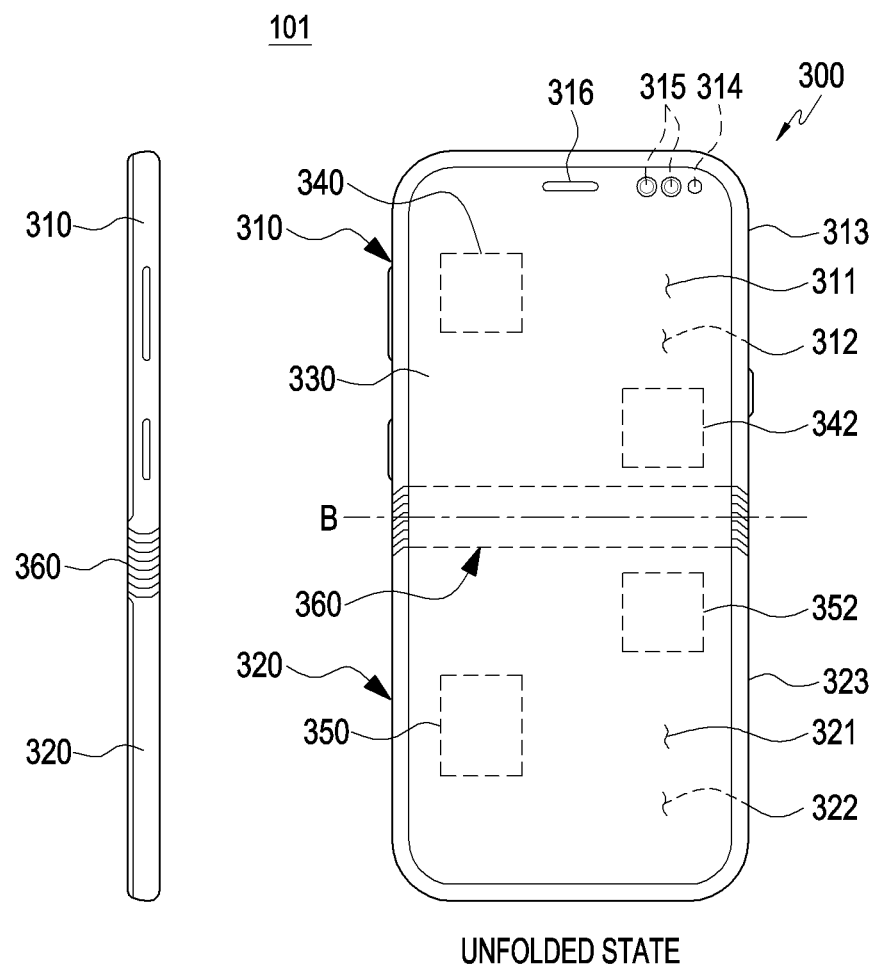
FIG. 3A is a view showing an unfolded state of an electronic device according to an embodiment of the disclosure.

FIG. 3A is a view showing the unfolded state of an electronic device according to an embodiment of the disclosure.

Referring to FIG. 3A, an electronic device 300 may include: a pair of housing structures 310 and 320 coupled to rotate about a folding axis B through a hinge structure 360 to fold over each other (e.g., a foldable housing structure); and a display 330 (e.g., a flexible display or a foldable display) disposed in a space defined by the pair of housing structures 310 and 320.

According to an embodiment, the display 330 may be implemented in a first shape when the electronic device 101 is unfolded. For example, the first shape may have a first aspect ratio (e.g., 4:3). According to an embodiment, the display 330 may be implemented in a second shape different from the first shape when the electronic device 300 of FIG. 3A is unfolded. For example, the second shape may have a second aspect ratio (16:9) different from the first aspect ratio (e.g., 4:3).

According to various embodiments, the first housing structure 310 and the second housing structure 320 may be disposed at both sides with the folding axis B (e.g., a transverse folding axis) therebetween.

According to an embodiment, the first housing structure 310, unlike the second housing structure 320, has a region in which a camera module 314 and various sensors 315 are disposed, but they may have a symmetric shape in the other region. As another embodiment, the region in which the camera module 314 and various sensors 315 are disposed may be additionally provided in or replaced by at least a partial region of the second housing structure 320.

As another embodiment, at least some of the camera module 314 and various sensors 315 may be disposed in at least a partial region of the first housing structure 310 and the other may be disposed in at least a partial region of the second housing structure 320.

According to various embodiment, the first housing structure 310 may have a first surface 311 disposed to face the front surface of the electronic device 300 in the unfolded state of the electronic device 300, a second surface 312 facing the opposite direction of the first surface 311, and a first side member 313 surrounding at least a portion of the space between the first surface 311 and the second surface 312.

According to various embodiment, the second housing structure 320 may have a third surface 321 disposed to face the front surface of the electronic device 300 in the unfolded state of the electronic device 300, a fourth surface 322 facing the opposite direction of the third surface 321, and a second side member 323 surrounding at least a portion of the space between the third surface 321 and the fourth surface 322.

According to various embodiments, the camera module 314 may be exposed through the front surface of the electronic device 300 through an opening formed at a corner of the first housing structure 310. The sensors 315 may include at least one of a proximity sensor, an illumination sensor, an iris sensor, an ultrasonic sensor, or an indicator. For example, the sensors 315 may be exposed through the front surface of the electronic device 300 through an opening formed at a corner of the first housing structure 310 or may be disposed at the lower end of at least a partial region of the display 330.

According to various embodiments, the first housing structure 310 may include a receiver 316 disposed in at least a partial region. In an embodiment, the electronic device 300, though not shown in the figures, may include an ear jack hole, an external type speaker module, a SIM card tray, an interface connector port, or at least one key button disposed in the first housing structure 310 and/or the second housing structure 320.

According to various embodiments, one or more components may be disposed or visually exposed on the rear surface of the electronic device 300. According to an embodiment, one or more parts or sensors may be visually exposed through the rear surface (second surface) 312 of the first housing structure 310. The sensors may include a rear camera module 372 and/or a proximity sensor 374. According to an embodiment, a sub-display 370 may be at least partially visually exposed through the rear surface 312 of the first housing structure 310.

According to various embodiments, the angle or the distance between the first housing structure 310 and the second housing structure 320 may depend on the unfolded state (or a flat state) (e.g., the state of FIG. 3A), the folded state (e.g., the state of FIG. 3B), or the intermediate state of the electronic device 300. Not limited to the above description, a closed state, an open state, and a half folded state of the electronic device may be determined in accordance with the angle between the first housing structure 310 and the second housing structure 320, which will be described below. The term 'state' may be replaced with a 'mode'.

According to various embodiments, the electronic device 300 may include a first motion sensor 340 and a magnet substance (e.g., a magnet) 342 that are disposed in at least a portion of the first housing structure 310. According to an embodiment, the first motion sensor 340 may be a combination of at least two of an acceleration sensor, an angular speed sensor (e.g., a gyro sensor), or a geomagnetic sensor. For example, the electronic device 300 can sense the pose and the gesture of the first housing structure 310 through the first motion sensor 340. In detail, the pose of the first housing structure 310 can be sensed, based on the acceleration sensor of the first motion sensor 340, and the gesture of the first housing structure 310 can be sensed, based on the angular speed sensor of the first motion sensor 340. According to an embodiment, the magnetic substance 342 may be disposed in at least a portion of the first housing structure 310 adjacent to the hinge structure 360.

According to various embodiments, the electronic device 300 may include a second motion sensor 350 and a magnetic force sensor module 352 that are disposed in at least a portion of the second housing structure 320. According to an embodiment, the second motion sensor 350 may be a combination of at least two of an acceleration sensor, an angular speed sensor (e.g., a gyro sensor), or a geomagnetic sensor. For example, the electronic device 300 can sense the pose of the second housing structure 320 through the acceleration sensor of the second motion sensor 350 and can sense the gesture of the second housing structure 320 through the angular speed sensor of the second motion sensor 350. According to an embodiment, the magnetic force sensor module 352 may be disposed in at least a portion of the second housing structure 320 adjacent to the hinge structure 360. For example, the magnetic substance 342 of the first housing structure 310 and the magnetic force sensor module 352 of the second housing structure 320, as shown in FIG. 3B, may be disposed to at least partially face each other in the folded state of the electronic device 300.

Figure 3B:
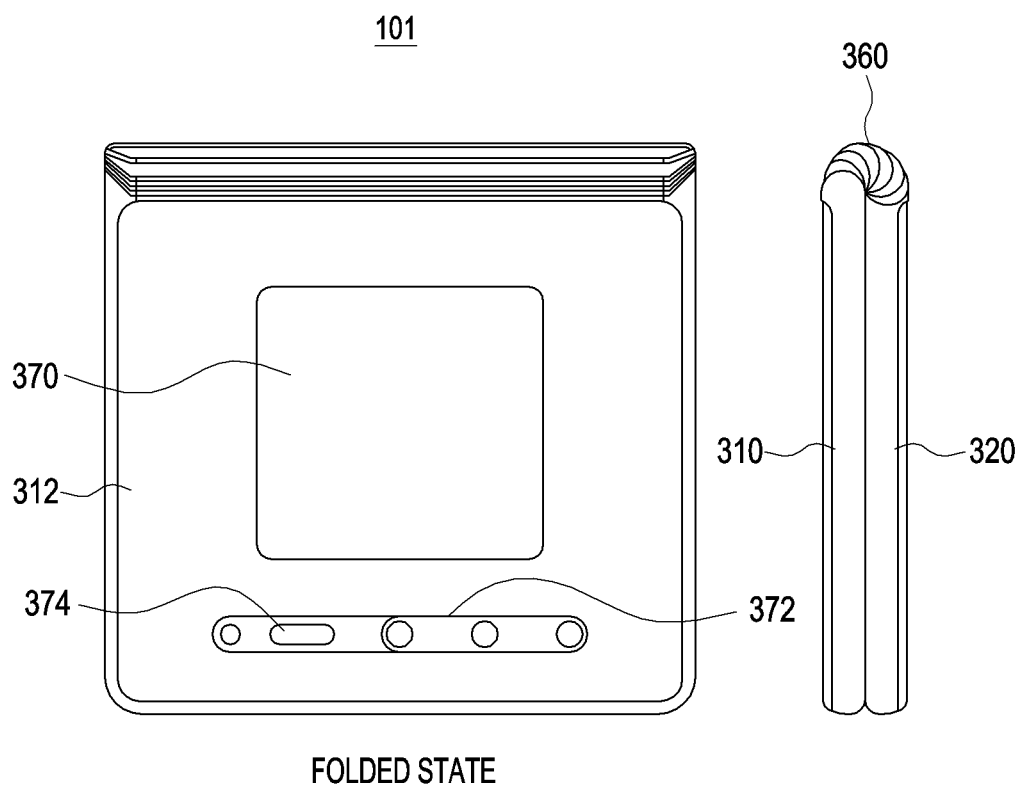
FIG. 3B is a view showing a folded state of an electronic device according to an embodiment of the disclosure.

FIG. 3B is a view showing a folded state of an electronic device according to an embodiment of the disclosure.

Referring to FIG. 3B, an electronic device 300 may include: a pair of housing structures 310 and 320 coupled to rotate about a folding axis B (e.g., a transverse folding axis) through a hinge structure 360 to fold over each other (e.g., a foldable housing structure); and a display 330 (e.g., a flexible display or a foldable display) disposed in a space defined by the pair of housing structures 310 and 320.

According to various embodiments, sensors may include a rear camera module 372 and/or a proximity sensor 374. According to an embodiment, a sub-display 370 may be at least partially visually exposed through the rear surface 312 of the first housing structure 310.

According to various embodiments, one or more components may be disposed or visually exposed on the rear surface of the electronic device 300. According to an embodiment, one or more parts or sensors may be visually exposed through the rear surface (second surface) 312 of the first housing structure 310. The sensors may include a rear camera module 372 and/or a proximity sensor 374. According to an embodiment, a sub-display 370 may be at least partially visually exposed through the rear surface 312 of the first housing structure 310.

Figure 4:
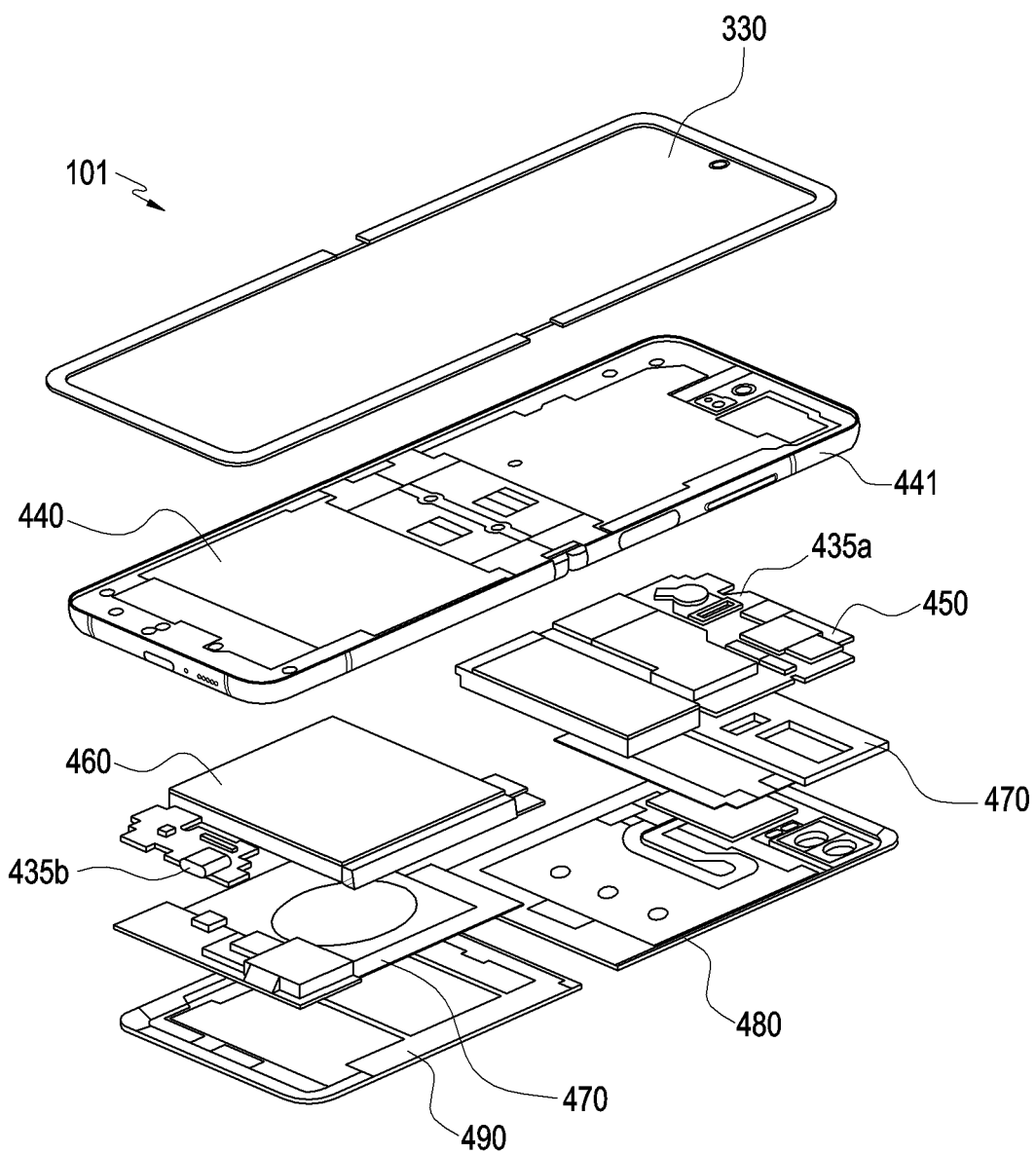
FIG. 4 is an exploded perspective view of an electronic device according to an embodiment of the disclosure.

FIG. 4 is an exploded perspective view of an electronic device (e.g., the electronic device 101 of FIG. 1) according to an embodiment of the disclosure.

Referring to FIG. 4, an electronic device 101 may include a display 330, a printed circuit board 450, a battery 460, a rear case 470, a first rear cover 480, and a second rear cover 490. The electronic device 101, the display 330, the first rear cover 480, and the second rear cover 490 of FIG. 4 may be entirely or partially the same as the electronic device 101, the display 200, the first rear cover 380, and the second rear cover 490 of FIG. 2.

According to various embodiments, a front case 440 may be disposed in the electronic device 101 and connected with a lateral bezel structure 441, or may be integrated with the lateral bezel structure 441. The front case 440, for example, may be made of a metallic material and/or a non-metallic material (e.g., a polymer). The display 330 may be coupled to a surface of the front case 440 and the printed circuit board 450 may be coupled to the other surface of the front case 440. According to an embodiment, the front case 440 may be at least a portion of the first housing structure 310 or the second housing structure 320.

According to various embodiments, a camera module (e.g., the camera module 207 of FIG. 2) may be disposed in the front case 440. The camera module 207 may be exposed out of the electronic device through an opening or a recess formed at the display 330.

According to various embodiments, a processor, a memory, and/or an interface may be mounted on the printed circuit board 450. The processor, for example, may include one or more of a CPU, an application processor, a graphic processor, an image signal processor, a sensor hub processor, or a communication processor. The memory may include a volatile memory or a nonvolatile memory. The interface may include a High Definition Multimedia Interface (HDMI), a Universal Serial Bus (USB) interface, an SD card interface, and/or an audio interface. The interface, for example, can electrically or physically connect the electronic device 101 to external electronic devices and may include a USB connector, an SD card/MMC connector, or an audio connector.

According to various embodiments, the battery 460, which is a device for supplying power to one or more components of the electronic device 101, may include a primary battery that is not rechargeable, a secondary battery that is rechargeable, or a fuel cell. At least a portion of the battery 460, for example, may be disposed in substantially the same plane as the printed circuit board 450. The battery 460 may be integrally disposed in the electronic device 101 and may be detachably attached to the electronic device 101.

According to various embodiments, the rear case 470 may be disposed under the printed circuit board 450. According to an embodiment, the rear case 470 may have a surface to which at least one of the printed circuit board 450 or the battery 460 is coupled. According to another embodiment, the rear case 470 may have another surface to which an antenna is coupled. The antennal may be disposed between the first rear cover 480 and the battery 460. The antenna, for example, may include a Near Field Communication (NFC) antenna, a wireless charging antenna, and/or a Magnetic Secure Transmission (MST) antenna. The antenna, for example, can perform near field communication with external devices or can wirelessly transmit and receive power for charging. In another embodiment, an antenna structure may be formed by a portion or a combination of the lateral bezel structure 441 and/or the front case 440.

According to various embodiments, the first rear cover 480 and the second rear cover 490 may form a portion of the external appearance of the electronic device 101. For example, the first rear cover 480 and the second rear cover 490 may be disposed under the rear case 470. According to an embodiment, the first rear cover 480 may be disposed under the first housing structure 310 and the second rear cover 490 may be disposed under the second housing structure 320.

According to various embodiments, in the printed circuit board of the electronic device 101, a first microphone 435a may be disposed at a position corresponding to the first housing structure 310 and a second microphone 435b may be disposed at a position corresponding to the second housing structure 320.

Figure 5:
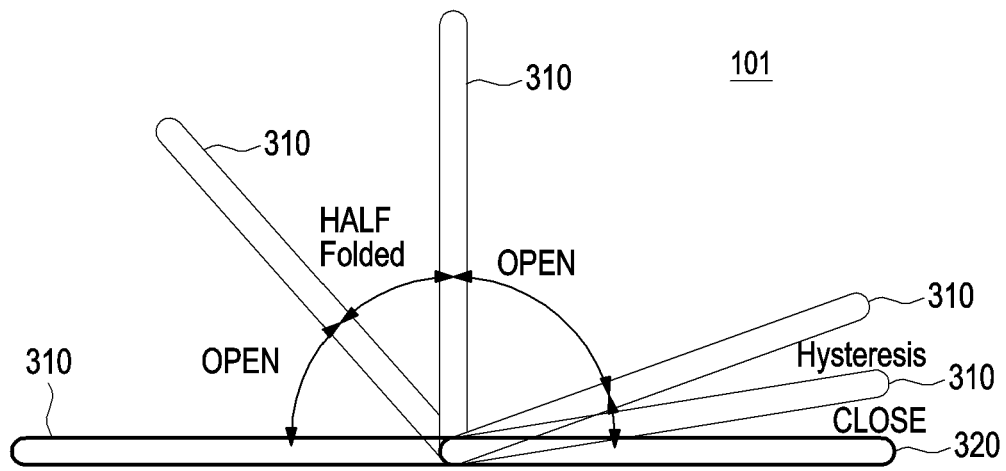
FIG. 5 is a view showing modes relating to an angle between housings (e.g., a first housing and a second housing) of an electronic device according to an embodiment of the disclosure.

FIG. 5 is a view showing modes relating to the angle between housings (e.g., the first housing 310 and the second housing 320) of an electronic device according to an embodiment of the disclosure.

Referring to FIG. 5, the electronic device 101 (e.g., at least one processor 120) can identify the state of housings (e.g., the first housing 310 and the second housing 320) (e.g., the angle between the first housing 310 and the second housing 320) and can identify the mode corresponding to the identified state. For example, the electronic device can identify the angle between the first housing 310 and the second housing 320, and as shown in FIG. 5, can identify a second mode 502 corresponding to a second angle range including the identified angle of a plurality of modes 501.

For example, the electronic device 101 (e.g., at least one processor 120) can identify the mode corresponding to the angle between the housings (e.g., the first housing 310 and the second housing 320). The electronic device 101, as shown in FIG. 5, can store a plurality of modes 501 related to the angle between the first housing 310 and the second housing 320 in the memory 130, and can identify the mode corresponding to the current angle between the first housing 310 and the second housing 320. The modes 501 (e.g., the first mode and the second mode of FIG. 5) may respectively correspond to specific angle ranges (e.g., the first angle range and the second angle range of FIG. 5). For example, the modes 501 may include a close mode corresponding to an angle range of 0° to 10°, a hysteresis mode corresponding to an angle range of 11° to 20°, a first open mode corresponding to an angle range of 21° to 90°, a half folded mode corresponding to an angle range of 91° to 130°, and a second open mode corresponding to an angle range of 131° to 180°. The hysteresis mode may be a mode in which a predetermined event (e.g., an execution image background event) does not occur in accordance with the angle between the first housing 310 and the second housing 320. The angle ranges respectively corresponding to the modes 501 may be configured in various ways without being limited to those described above. The specific angle range may mean a specific range from an angle to another angle or may mean only a specific angle. For example, the first mode (e.g., the open mode) may be configured to correspond to a specific angle (e.g., 180°) or to corresponding to a specific angle range (e.g., 131° to 180°). The angle ranges respectively corresponding to the modes 501 may be configured to be different from each other, depending on whether the electronic deice 101 is in contact with the ground.

According to various embodiments, the mode may be the concept of information unit for the electronic device 101 (e.g., at least one processor 120) to identify the current states of the housings included in the electronic device 101. Accordingly, the electronic device 101 can provide services corresponding to the current states of the housings (e.g., the angle between the housing) to a user by generally controlling the operation of the electronic device 101, based on the current mode.

According to various embodiments, the disclosure is not limited thereto and the same description may be referred to even if even more than two housings are provided. For example, when the electronic device 101 includes three housings (e.g., the first housing 310 to a third housing), a first mode corresponding to a first angle range between the first housing 310 and the second housing 320 and a second angle range between the second housing 320 and the third housing may be determined.

In the following description, for the convenience of description, for example, when the first angle is included in a predetermined range, it means that the current angle is included in an angle range corresponding to the half folded mode. Accordingly, the following description may be referred to not only when the current angle is included in an angle range corresponding to the half folded mode, but also when it is included in an angle range corresponding to another mode.

According to various embodiments, the electronic device 101 (e.g., at least one processor 120) can identify the angle between the first housing 310 and the second housing 320 at various points in time.

For example, the electronic device 101 (e.g., at least one processor 120) can identify the angle between the first housing 310 and the second housing 320 when at least one of the first housing 310 and the second housing 320 starts to rotate (e.g., clockwise or counterclockwise).

For example, the electronic device 101 (e.g., at least one processor 120) can identify the angle between the first housing 310 and the second housing 320 when at least one of the first housing 310 or the second housing 320 starts to rotate about a rotational axis and keeps rotating. As another example, the electronic device 101 can identify the angle between the first housing 310 and the second housing 320 when at least one of the first housing 310 or the second housing 320 stops rotating after starting to rotate about a rotational axis.

For example, the electronic device 101 (e.g., at least one processor 120) can identify the angle between the first housing 310 or the second housing 320 regardless of rotation of at least one of the first housing 310 and the second housing 320.

Figure 6A:
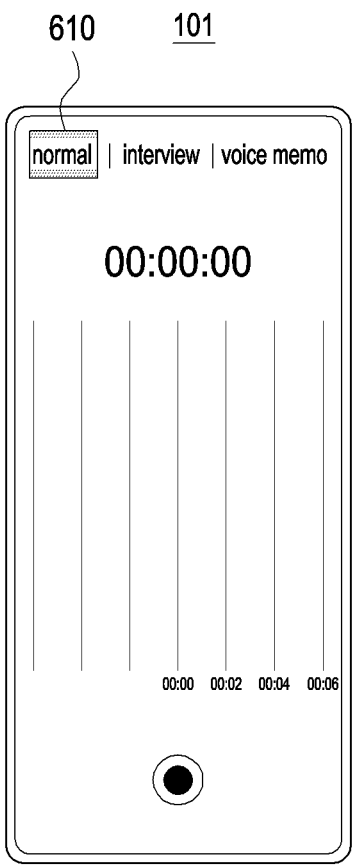
FIG. 6A is a view showing a normal mode of a voice recording mode of an electronic device according to an embodiment of the disclosure.

FIG. 6A is a view showing a normal mode of a voice recording mode of an electronic device according to an embodiment of the disclosure.

Figure 6B:
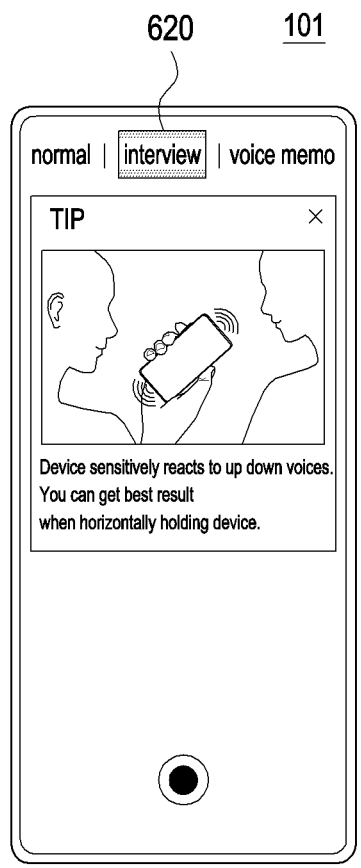
FIG. 6B is a view showing an interview mode of a voice recording mode of an electronic device according to an embodiment of the disclosure.

FIG. 6B is a view showing an interview mode of a voice recording mode of an electronic device according to an embodiment of the disclosure.

Figure 6C:
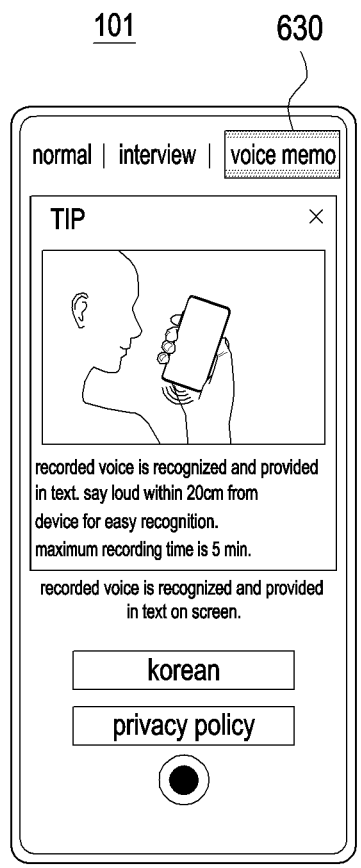
FIG. 6C is a view showing a voice memo mode of a voice recording mode of an electronic device according to an embodiment of the disclosure.

FIG. 6C is a view showing a voice memo mode of a voice recording mode of an electronic device according to an embodiment of the disclosure.

According to various embodiments, a user can perform a recording function in the electronic device 101 and can select one voice recording mode (e.g., a normal mode, an interview mode, and a voice memo mode) of various voice recording modes.

Referring to FIG. 6A, when a normal mode 610 is selected, a stereo function or a mono function of a plurality of microphones included in the electronic device 101 may be configured.

Referring to FIG. 6B, when an interview mode 620 is selected, a voice beamforming function may be configured.

Referring to FIG. 6C, when a voice recording mode 630 is selected, an input voice may be changed into a text and displayed on the display, and the stereo function of the mono function may be set.

Figure 7A:
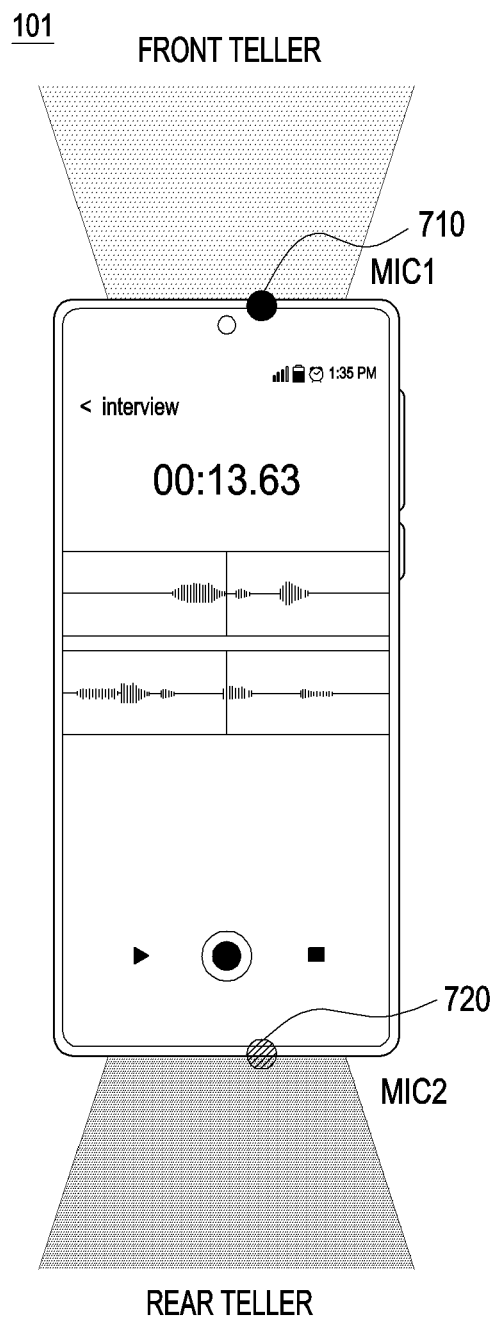
FIG. 7A is a view showing voice beamforming in an unfolded state of an electronic device according to an embodiment of the disclosure.

FIG. 7A is a view showing voice beamforming in an unfolded state of an electronic device according to an embodiment of the disclosure.

Figure 7B:
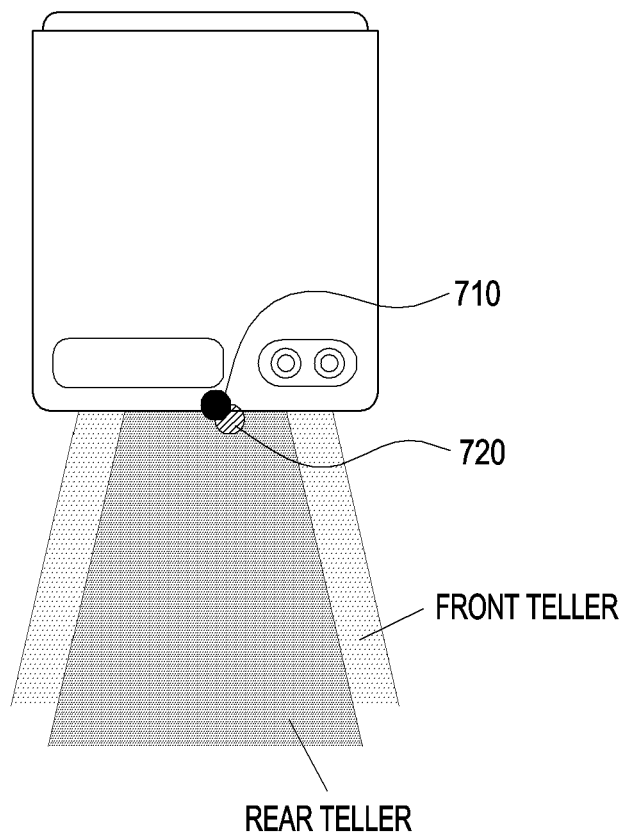
FIG. 7B is a view showing voice beamforming in a folded state of an electronic device according to an embodiment of the disclosure.

FIG. 7B is a view showing voice beamforming in a folded state of an electronic device according to an embodiment of the disclosure.

Figure 8A:
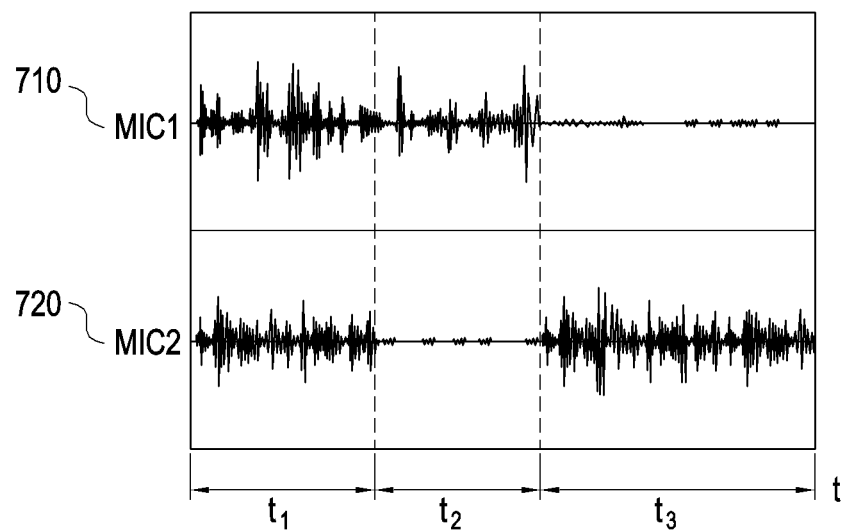
FIG. 8A is a view showing a voice signal in an unfolded state of an electronic device according to an embodiment of the disclosure.

FIG. 8A is a view showing a voice signal in an unfolded state of an electronic device according to an embodiment of the disclosure.

Figure 8B:
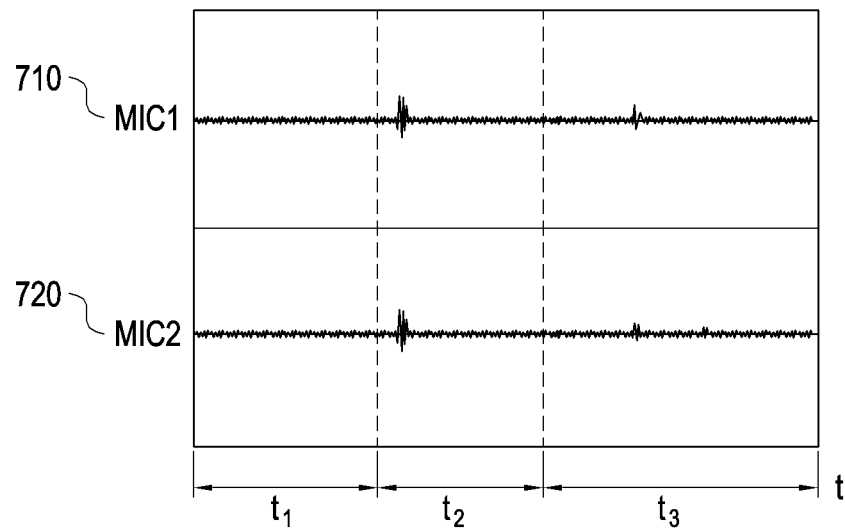
FIG. 8B is a view showing a voice signal in a folded state of an electronic device according to an embodiment of the disclosure.

FIG. 8B is a view showing a voice signal in a folded state of an electronic device according to an embodiment of the disclosure.

Referring to FIG. 7A, a first microphone 710 may be disposed at the upper portion of the electronic device 101 and a second microphone 720 may be disposed at the lower portion. When the voice recording mode of the electronic device 101 is selected as the interview mode, voice beamforming is applied to the voice signals input to the first microphone 710 and the second microphone 720, whereby voice signals with directionalities can be input. Voice beamforming makes it possible to receive directional sounds and removes surrounding noise, so it can be applied to the interview mode.

Referring to FIG. 7B, when a user folds the electronic device 101 into the folded state, the first microphone 710 and the second microphone 720 are placed at the same position. When voice beamforming is applied in accordance with the interview mode in the folded state of the electronic device 101, the effect of offsetting voice signals is generated, so a problem that recording is not normally performed may occur.

Referring to FIG. 8A, when the electronic device 101 is in the unfolded state, as shown in the figure, upper/lower voices are separated, whereby recording can be normally performed. That is, it can be seen that the signal input through the first microphone 710 and the signal input through the second microphone 720 are detected at the point in time $t_1$, only the signal input through the first microphone 710 is detected at the point in time $t_2$, and only the signal input through the second microphone 720 is detected at the point in time $t_3$.

Referring to FIG. 8B, in the folded state of the electronic device 101, voice beamforming is applied with the first microphone 710 and the second microphone 720 placed at the same position, so it can be seen that the voice signals input through the two microphones 710 and 720 are offset each other and thus voice recording is not normally performed. As described above, when a foldable electronic device is folded, top/bottom physical microphones face the same direction, so there may be a problem that the sound quality is deteriorated and recording is stopped when beamforming is applied. Since it is possible to selectively use the microphones when folding the electronic device 101 or it is possible to change the configuration of the recording functions after finishing recording for example by stopping voice beamforming, the normal function of the interview mode cannot be provided.

According to various embodiments, when the electronic device 101 is folded with the stereo function configured for voice recording, the first microphone 710 and the second microphone 720 are placed at the same positions, so the same operation as mono recording is performed without the substantial effect of stereo recording.

Figure 9:
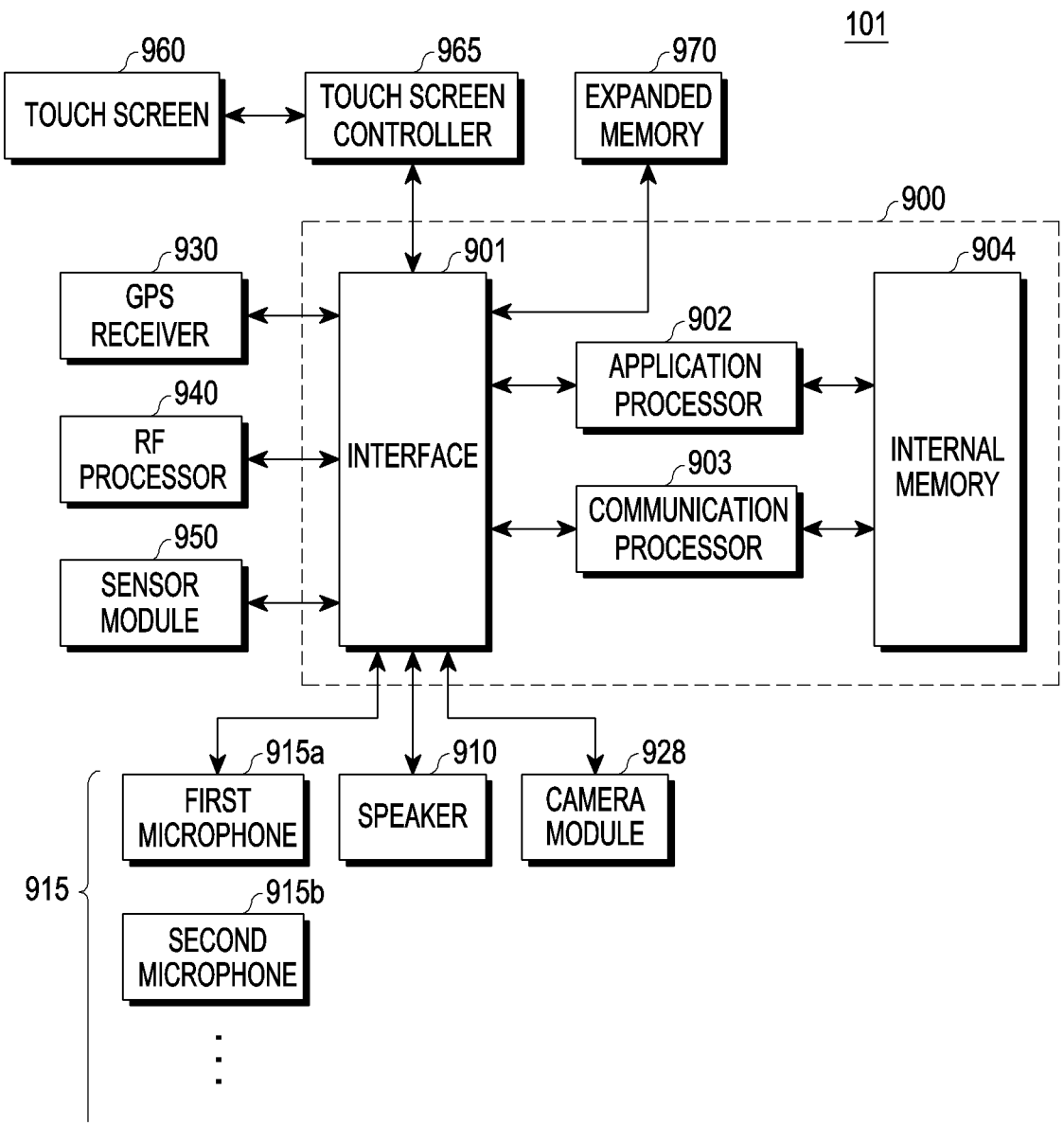
FIG. 9 is a block diagram showing a detailed configuration of an electronic device according to an embodiment of the disclosure.

FIG. 9 is a block diagram showing a detailed configuration of an electronic device according to an embodiment of the disclosure.

Referring to FIG. 9, the electronic device 101 may include a controller 900, a speaker 910, a plurality of microphones 915, a camera module 928, a GPS receiver 930, an RF processor 940, a sensor module 950, a touch screen 960, a touch screen controller 965, and an expanded memory 970.

The controller 900 may include an interface 901, one or more processors 902 and 903, and an internal memory 904. Depending on cases, the entire controller 900 may be referred to as a processor. The interface 901, the application processor 902, the communication processor 903, and the internal memory 904 may be separate components, but may be integrated on one or more integrated circuits.

According to various embodiments, the electronic device 101 may include a plurality of microphones 915. For example, a first microphone 915a may be disposed in a first housing structure (e.g., the first housing structure 310 of FIG. 2) and a second microphone 915b may be disposed in a second housing structure (e.g., the second housing structure 320 of FIG. 2).

In various embodiments, the expanded memory 970 or the internal memory 904 can be controlled by the application processor 920 to store voices beamformed through the microphones 915.

Figure 10:
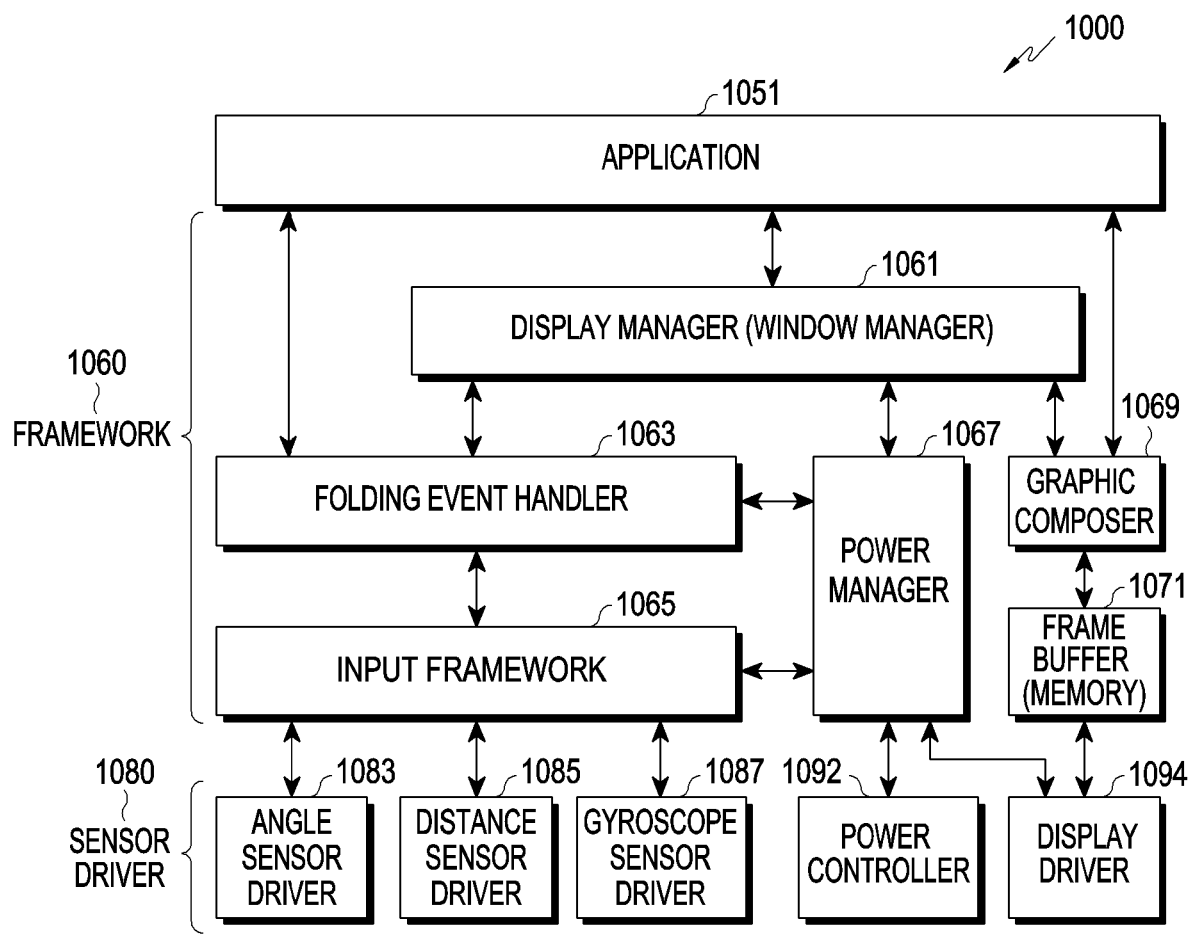
FIG. 10 is a block diagram showing a detailed configuration of an electronic device according to an embodiment of the disclosure.

FIG. 10 is a block diagram showing a detailed configuration of an electronic device according to an embodiment of the disclosure.

Referring to FIG. 10, a program 1000 (e.g., the program 140 of FIG. 1) may include an application 1051, a framework 1060, and a sensor driver 1080.

According to an embodiment, the application 1051 may have a database of at least one or more applications that are executed in the electronic device 101, and may give a request for executing a specific application in correspondence to input from a user.

According to an embodiment, a display manager 1061 (or a window manager) can control the state of the display 200. The display manager 1061 can determine the size, position, or transparency of a window shown on the display 200, and can perform a drawing control command for the window. The display manager and the window manager may be separately implemented.

According to an embodiment, a power manager 1067 can manage the power state of the entire electronic device 101 or some modules to efficiently control the power consumption by the electronic device 101. Management of the power state, for example, may be performed by controlling a voltage or a clock frequency.

According to an embodiment, an input framework 1065 can receive various sensor values for measuring the unfolded/folded states of the electronic device 101. The input framework 1065 can determine and transmit the unfolded/folded states of the electronic device 101 to the processor 120 by identifying sensor values obtained from at least one or more sensors.

According to an embodiment, a folding event holder 1063 can receive folded/unfolded events of the electronic device 101 transmitted to the processor 120 and can control the display 200 and the sub-display 210 to be turned on/off through the power manager 1067.

According to an embodiment, a graphic composer 1069 can combine and store graphic information of windows on the displays 200 into a frame buffer (memory) 1071. The frame buffer 1071 can store graphic information to be output to the displays 200 and 210. A sensor driver 1080 (e.g., an angle sensor driver 1083, a distance sensor driver 1085, and a gyroscope sensor driver 1087) may be software modules for controlling a sensor Integrated Circuit (IC).

According to an embodiment, the electronic device 101 can determine a display to be activated in correspondence to a change into a second state from a first state of the electronic device 101.

For example, the sensor driver 1080 (e.g., at least one or more of the angle sensor driver 1083, the distance sensor driver 1085, and the gyroscope sensor driver 1087) can transmit sensing values to the input framework 1065. The input framework 1065 can transmit information that the electronic device 101 is in the second state to the folding event handler 1063 using the obtained sensing values.

The folding event handler 1063, for example, can transmit a request to activate the display 200 and inactivate the sub-display 210 to the power manager 1067 and the display manager 1061, based on the state of the application that is being executed now, a policy stored in advance in correspondence to a state change of the electronic device 101, and an activation/inactivation allowance state of the displays 200 and 210.

The power manager 1067 can control the display driver 1094 to activate the display 200 and inactivate the sub-display 210 in correspondence to a request obtained from the folding event handler 1063 in cooperation with the power controller 1092. Inactivation of the sub-display 210 and activation of the display 200 may be sequentially or simultaneously performed.

According to various embodiments, activation or inactivation of the displays 200 and 210 may be performed by controlling the currents that are applied to the displays 200 and 210 and by controlling the brightness of light source elements of the displays 200 and 210. Activation or inactivation of the displays 200 and 210 may be performed using both or only one of the power manager 1067 and the display manager 1061.

The display manager 1061 can configure and display an image, which is shown while the displays 200 and 210 are changed into the activation state from the inactivation state, can control the positions and sizes of the windows displayed on the displays 200 and 210, can remove the image shown while the displays 200 and 210 are changed into the activation state from the inactivation state, and then can display the windows on the displays 200 and 210, in correspondence to the request obtained from the folding event handle 1063.

Figure 11A:
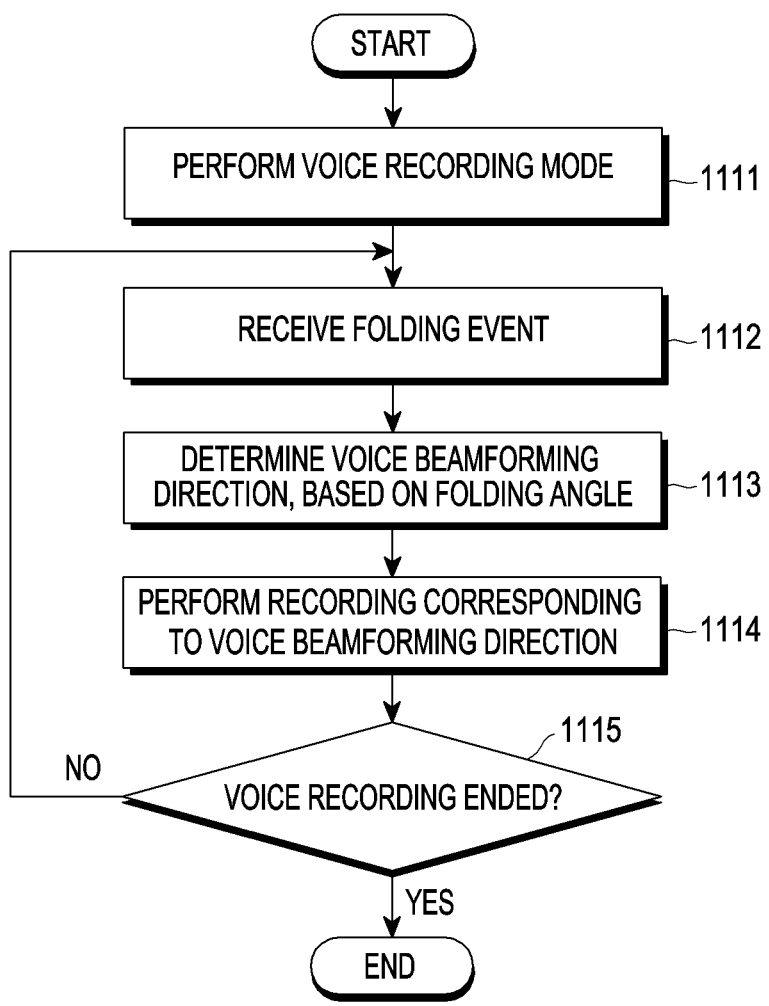
FIG. 11A is a flowchart showing an embodiment of an operation of an electronic device according to an embodiment of the disclosure.

FIG. 11A is a flowchart showing an embodiment of the operation of an electronic device according to an embodiment of the disclosure.

Referring to FIG. 11A, the electronic device 101, in operation 1111, can perform a voice recording mode. According to various embodiments, the voice recording mode may include at least one of a normal mode, an interview mode, and a voice memo mode.

According to various embodiments, the electronic device 101 can receive a folding event in operation 1112. The folding event may include an event occurring due to a change of the folding angle between the first housing structure 310 and the second housing structure 320. According to various embodiments, the folding event may be an event that occurs when the electronic device 101 is fully unfolded or fully folded.

According to various embodiments, the electronic device 101, in operation 1113, can determine the folding angle in correspondence to reception of the folding event, and can determine the direction of voice beamforming, based on the determined folding angle.

The voice beamforming may include a technology that maintains continuity of a recording function even if the position of a microphone is changed by a change of the folding state of an electronic device. For example, the voice beamforming may include a technology that amplifies a signal by recognizing directionality when one of two signals from a first microphone disposed at the upper end of the electronic device and a second microphone disposed at the lower end, and decreases a volume by determining that it is a surrounding sound when the same signals are input.

According to various embodiments, the electronic device 101 can perform recording in correspondence to the direction of the determined voice beamforming in operation 1114. The electronic device 101, in operation 1115, can finish the voice recording when receiving a signal corresponding to end of the voice recording mode. The electronic device 101 can go to operation 1112 when not receiving a signal corresponding to end of the voice recording mode in operation 1115, and can repeat the above procedure when receiving a folding event.

Figure 11B:
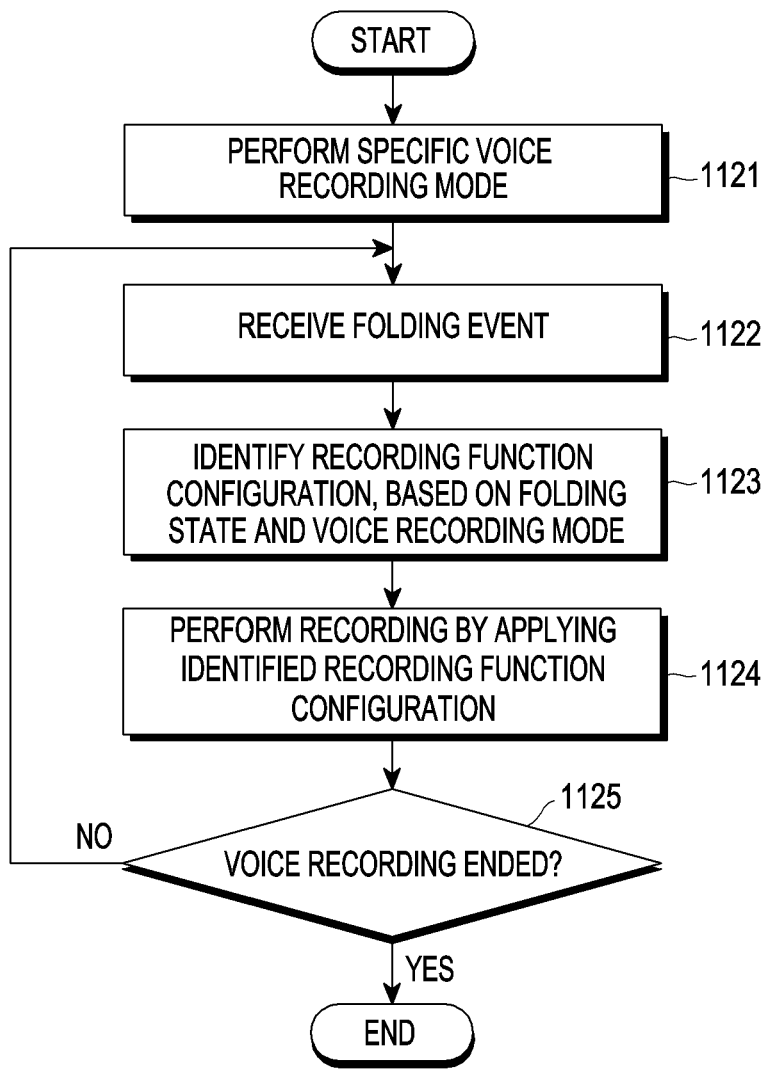
FIG. 11B is a flowchart showing an embodiment of an operation of an electronic device according to an embodiment of the disclosure.

FIG. 11B is a flowchart showing an embodiment of an operation of an electronic device according to an embodiment of the disclosure.

Referring to FIG. 11B, the electronic device 101, in operation 1121, can perform a specific voice recording mode. According to various embodiments, the specific voice recording mode may include at least one of a normal mode, an interview mode, and a voice memo mode.

According to various embodiments, the electronic device 101 can receive a folding event in operation 1122. The folding event may include an event occurring due to a change of the folding angle between the first housing structure 310 and the second housing structure 320. According to various embodiments, the folding event may be an event that occurs when the electronic device 101 is fully unfolded or fully folded.

According to various embodiments, the electronic device 101, in operation 1123, can determine a folding state (e.g., an unfolded state or a folded state) in correspondence to reception of the folding event, and can identify the configuration of a recording function, based on the folding state and the specific voice recording mode.

According to various embodiments, the electronic device 101 can perform recording by applying the identified configuration of the recording function in operation 1214. The electronic device 101, in operation 1125, can finish the voice recording when receiving a signal corresponding to end of the voice recording mode. The electronic device 101 can go to operation 1125 when not receiving a signal corresponding to end of the voice recording mode in operation 1122, and can repeat the above procedure when receiving a folding event.

According to various embodiments, the method of identifying the configuration of a recording function, based on the folding state and the specific voice recording mode may be implemented in various ways. For example, as in the following Table 1, it is possible to map and store the configuration of a recording function corresponding to a voice recording mode and a folding state into the memory 130 and then can identify the configuration of the recording function satisfying a corresponding condition.

TABLE 1

| | Configuration of recording function based on folding state | |
|---|---|---|
| Recording mode | Unfolded state | Folded state |
| Normal mode | Stereo function configured | Mono function configured |
| Interview mode | Beamforming function configured | Stereo or mono function configured |
| Voice memo mode | Stereo function configured | Mono function configured |

Referring to Table 1, when a recording mode is performed in the normal mode or the voice memo mode, the stereo function is configured when the electronic device 101 is in the unfolded state, but the configuration can be automatically changed into the mono function because there is no effect of stereo recording when the electronic device 101 is changed into the folded state.

According to various embodiments, referring to Table 1, when the recording mode is performed in the interview mode, the beamforming mode is configured when the electronic device 101 is in the unfolded state, but when the electronic device 101 is changed into the folded state, the sound quality may be deteriorated or recording may be stopped due to the beamforming function, so it is possible to automatically change the configuration of the beamforming function into an non-applied state and to automatically change the configuration into the stereo function or the mono function.

Figure 11C:
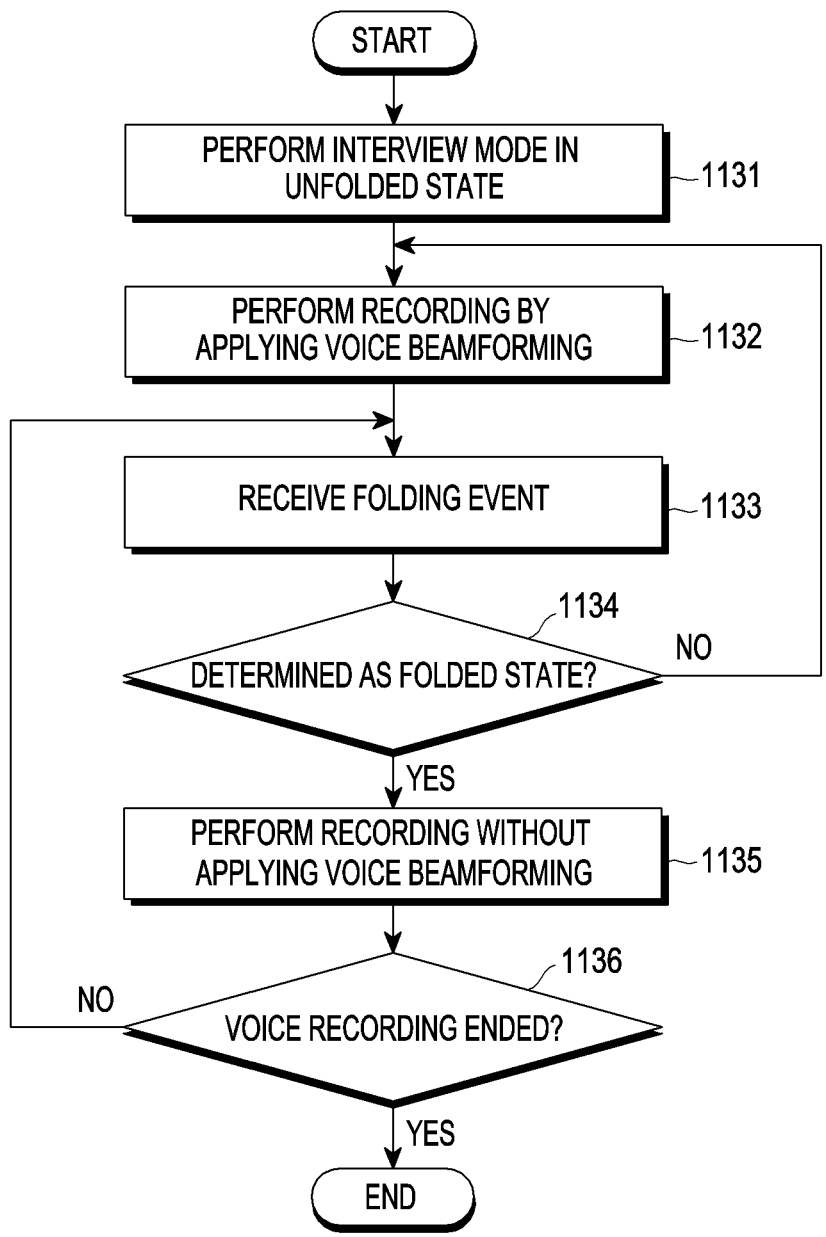
FIG. 11C is a flowchart showing an embodiment of an operation of an electronic device according to an embodiment of the disclosure.

FIG. 11C is a flowchart showing an embodiment of an operation of an electronic device according to an embodiment of the disclosure.

Referring to FIG. 11C, the electronic device 101, in operation 1131, can perform an interview mode in an unfolded state. According to various embodiments, when the recording mode of the interview mode is performed in the unfolded state, the electronic device 101, in operation 1132, can perform recording because voice beamforming is automatically applied.

According to various embodiments, the electronic device 101 can receive a folding event in operation 1133 while performing the interview mode in the unfolded state. The folding event may include an event occurring due to a change of the folding angle between the first housing structure 310 and the second housing structure 320. According to various embodiments, the folding event may be an event that occurs when the electronic device 101 is fully unfolded or fully folded.

According to various embodiments, the electronic device 101, in operation 1133, can determine a folding angle or a folding state in correspondence to reception of the folding event, and can perform recording without applying voice beamforming in operation 1135 when determining that the electronic device 101 is in the folded state in operation 1134 in accordance with the determined folding state. When it is determined that the electronic device 101 is in the unfolded state, not the folded state, in operation 1134 in accordance with the determined folding state, the electronic device 101 can perform recording by keeping applying voice beamforming in operation 1132.

The electronic device 101, in operation 1136, can finish the voice recording when receiving a signal corresponding to end of the voice recording mode. The electronic device 101 can go to operation 1136 when not receiving a signal corresponding to end of the voice recording mode in operation 1133, and can repeat the above procedure when receiving a folding event.

Figure 11D:
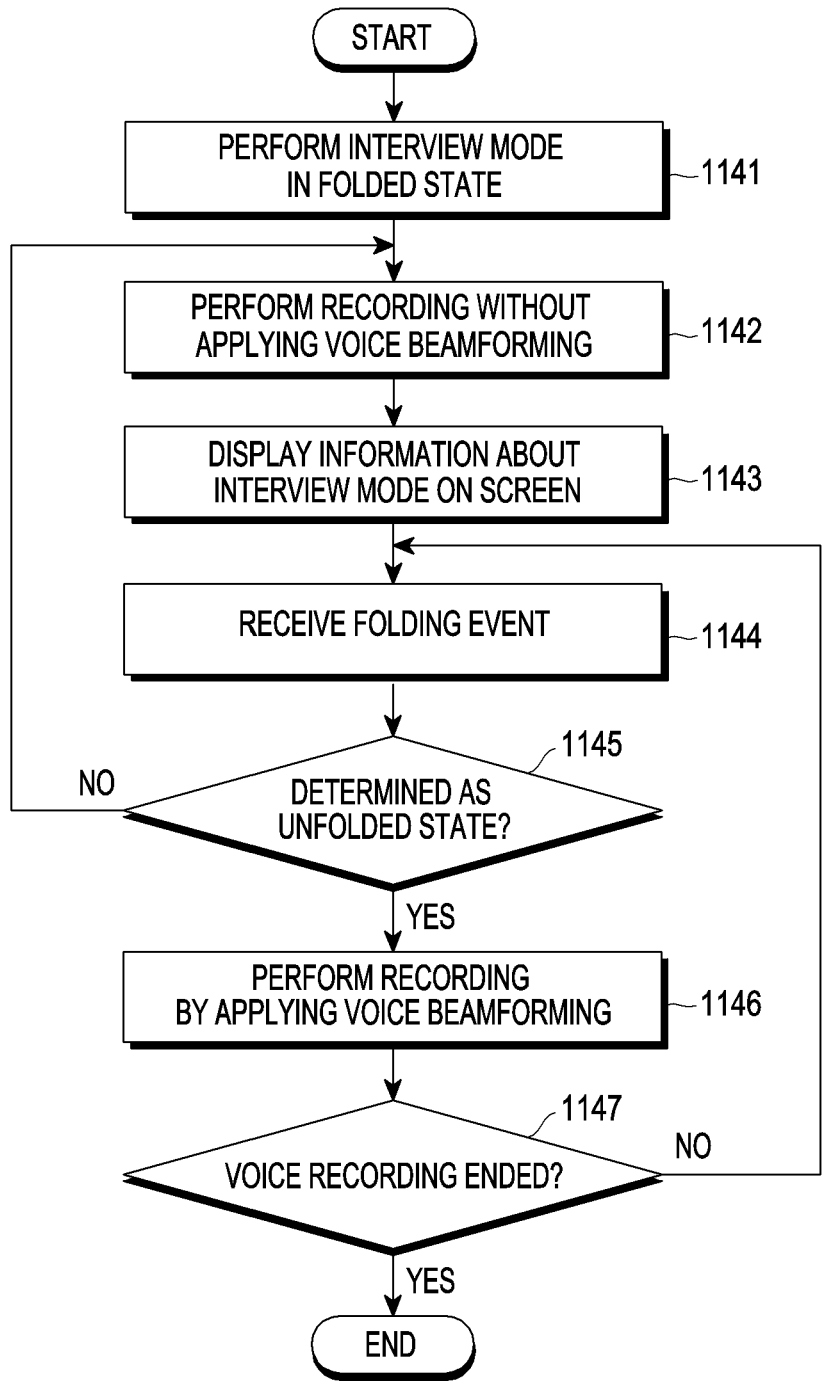
FIG. 11D is a flowchart showing an embodiment of an operation of an electronic device according to an embodiment of the disclosure.

FIG. 11D is a flowchart showing an embodiment of the operation of the electronic device according to an embodiment of the disclosure.

Referring to FIG. 11D, the electronic device 101, in operation 1141, can perform an interview mode in a folded state. According to various embodiments, when the recording mode of the interview mode is performed in the folded state, the electronic device 101, in operation 1142, can perform recording without applying voice beamforming According to various embodiments, the electronic device 101 can display information about the interview mode that is currently executed in operation 1143. For example, since it is impossible to provide the function of the normal interview mode to a user due to deterioration of the interview mode when the screen is folded, it is possible to display an image or a text that guides unfolding of the electronic device 101 on the screen.

According to various embodiments, the electronic device 101 can receive a folding event in operation 1144 while performing the interview mode in the folded state. The folding event may include an event occurring due to a change of the folding angle between the first housing structure 310 and the second housing structure 320. According to various embodiments, the folding event may be an event that occurs when the electronic device 101 is fully unfolded or fully folded.

According to various embodiments, the electronic device 101, in operation 1144, can determine a folding angle or a folding state in correspondence to reception of the folding event, and can perform recording by applying voice beamforming in operation 1146 when determining that the electronic device 101 is in the unfolded state in operation 1145 in accordance with the determined folding state. When it is determined that the electronic device 101 is in the folded state, not the unfolded state, in operation 1145 in accordance with the determined folding state, the electronic device 101 can perform recording by keeping not applying voice beamforming in operation 1142.

The electronic device 101, in operation 1147, can finish the voice recording when receiving a signal corresponding to end of the voice recording mode. The electronic device 101 can go to operation 1147 when not receiving a signal corresponding to end of the voice recording mode in operation 1144, and can repeat the above procedure when receiving a folding event.

Figure 12:
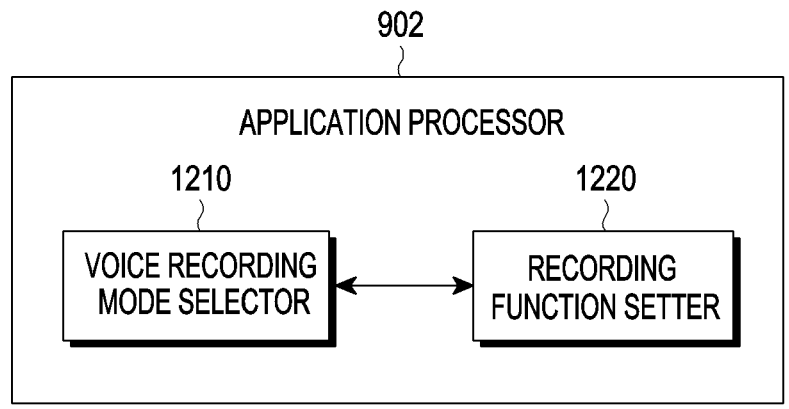
FIG. 12 is a block diagram showing a detailed configuration of an application processor of an electronic device according to an embodiment of the disclosure.

FIG. 12 is a block diagram showing a detailed configuration of an application processor of an electronic device according to an embodiment of the disclosure.

Referring to FIG. 12, an application processor 902 may include a voice recording mode selector 1210 and a recording function setter 1220. The electronic device 101 can perform voice recording mode reception (execute an application).

The voice recording mode selector 1210 can select one of a normal mode, an interview mode, and a voice memo mode (or a text mode) in accordance with input from a user. The information about the selected voice recording mode can be provided to the recording function setter 1220.

The recording function setter 1220 can control a plurality of microphones 915 such that voice beamforming is performed in accordance with the selected voice recording mode. For example, when the normal mode is selected by the voice recording mode selector 1210, the recording function setter 1220 can configure a beamforming direction to be able to receive a voice signal in all directions, and can show a visual effect for the voice beamforming direction corresponding to the normal mode by controlling a display device.

According to various embodiments, when the interview mode is selected by the voice recording mode selector 1210, the recording function setter 1220 can configure a beamforming direction forward to the microphones, and can show a visual effect for the voice beamforming direction corresponding to the interview mode by controlling a display device. Alternatively, when the voice memo mode (or the text mode) is selected, it is possible to configure a beamforming direction forward and rearward for the microphones and can show a visual effect for the voice beamforming direction corresponding to the voice memo mode (or the text mode) by controlling a display device.

Figure 13:
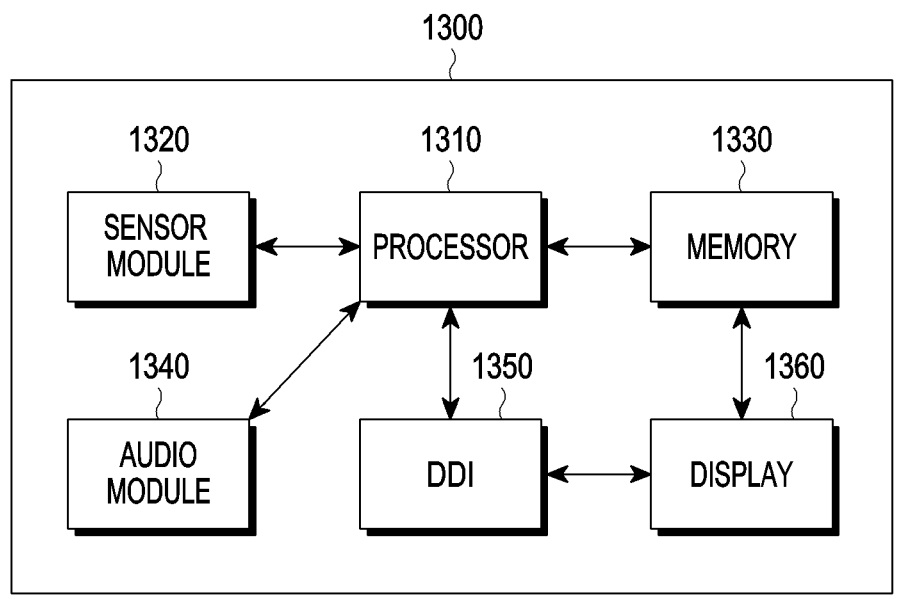
FIG. 13 is a block diagram showing a detailed configuration of an electronic device according to an embodiment of the disclosure.

FIG. 13 is a block diagram showing a detailed configuration of an electronic device according to an embodiment of the disclosure. The electronic device 101 can detect the folding angle of the display in a folding angle detection operation of the display. For example, it is possible to identify the folding angle of the display detected, based on at least one of the motion sensor or the magnetic force sensor. The processor can periodically identify whether the folding angle of the display detected through at least one of the motion sensor or the magnetic force sensor module is changed.

Referring to FIG. 13, an electronic device 1300 (e.g., the electronic device 101 of FIG. 1) may include a processor 1310, a display 1360, a sensor module 1320, a Display Driver Integrated Circuit (DDI) 1350, a memory 1330, an audio module 1340, or a combination thereof.

The DDI 1350 can receive, for example, image information including image data or an image control signal corresponding to a command for controlling image data from other components of the electronic device 1300 through an interface module. For example, the DDI 1350 can receive the image information from the processor 1310 or an auxiliary processor (not shown) (e.g., a graphic processor) independently operated from the function of the processor 1310. According to an embodiment, the DDI 1350 can communicate with the interface module through a touch circuit, a sensor module 1320, or the like. According to an embodiment, the DDI 1350 can store at least a portion of the received image information in the memory 1330, for example, in the unit of frame.

The audio module 1340 (e.g., the audio module 170 of FIG. 1) can convert a sound into an electrical signal or an electrical signal into a sound. According to an embodiment, the audio module 1340 can obtain a sound through a plurality of microphones (e.g., the microphones 915 of FIG. 9) or can output a sound through the sound output device 155 or an external electronic device (e.g., the electronic device 102) (e.g., a speaker or a headphone) connected to the electronic device 101 directly or wirelessly.

The electronic device 1300 may include two or more displays (e.g., the display 200 and the sub-display 210). The sensor module 1320 may include a motion sensor (e.g., the motion sensors 340 and 350 of FIG. 3A), and a magnetic force sensor module (e.g., the magnetic force sensor module 352 of FIG. 3A). When a state change of the electronic device 101 is recognized through the sensor module 1320, the information of the display region corresponding to the changed state of the electronic device 101 can be transmitted to the processor 1310.

In an embodiment, when a state change of the electronic device is recognized, a window manager can transmit the information of the display region corresponding to the changed state of the electronic device 101 to an application in which continuity is configured of the applications that are current executed. In an embodiment, the display region of a display according to the state before changing of the electronic device may be referred to as a first display region and the display region of the display according to the state after changing of the electronic device may be referred to as a second display region. According to an embodiment, when a folding event occurs while the voice recording function is performed in the interview mode, the recording state may be displayed in the second display region.

Figure 14:
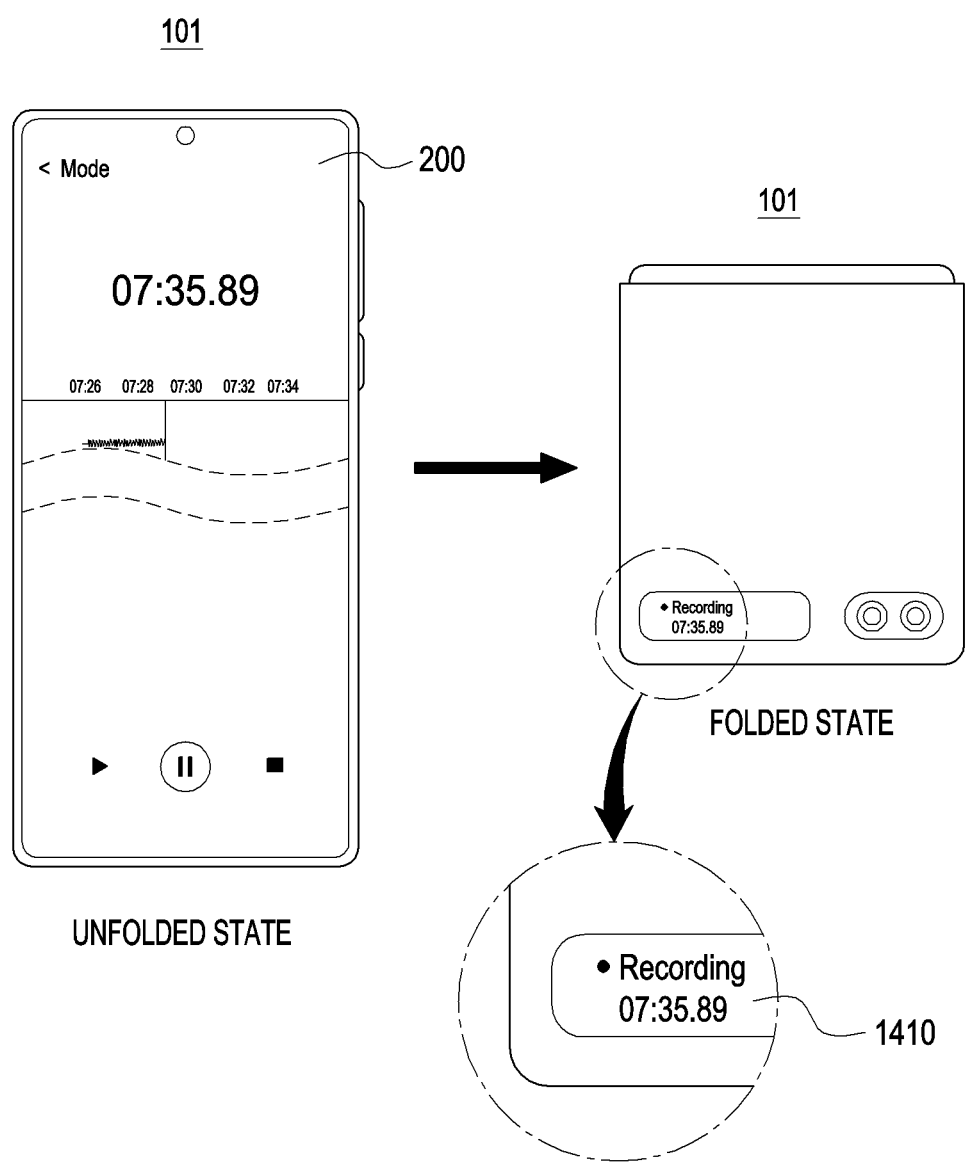
FIG. 14 is a view showing a user interface (UI) displayed in a screen of an electronic device according to an embodiment of the disclosure.

FIG. 14 is a view showing a UI displayed in a screen of an electronic device according to an embodiment of the disclosure.

Referring to FIG. 14, the electronic device 101 can display the current recording state on the display 200 in the unfolded state. According to various embodiments, when the electronic device 101 is changed into the folded state, the current recording state can be displayed on a sub-display 1410 (e.g., the sub-display 210).

Figure 15:
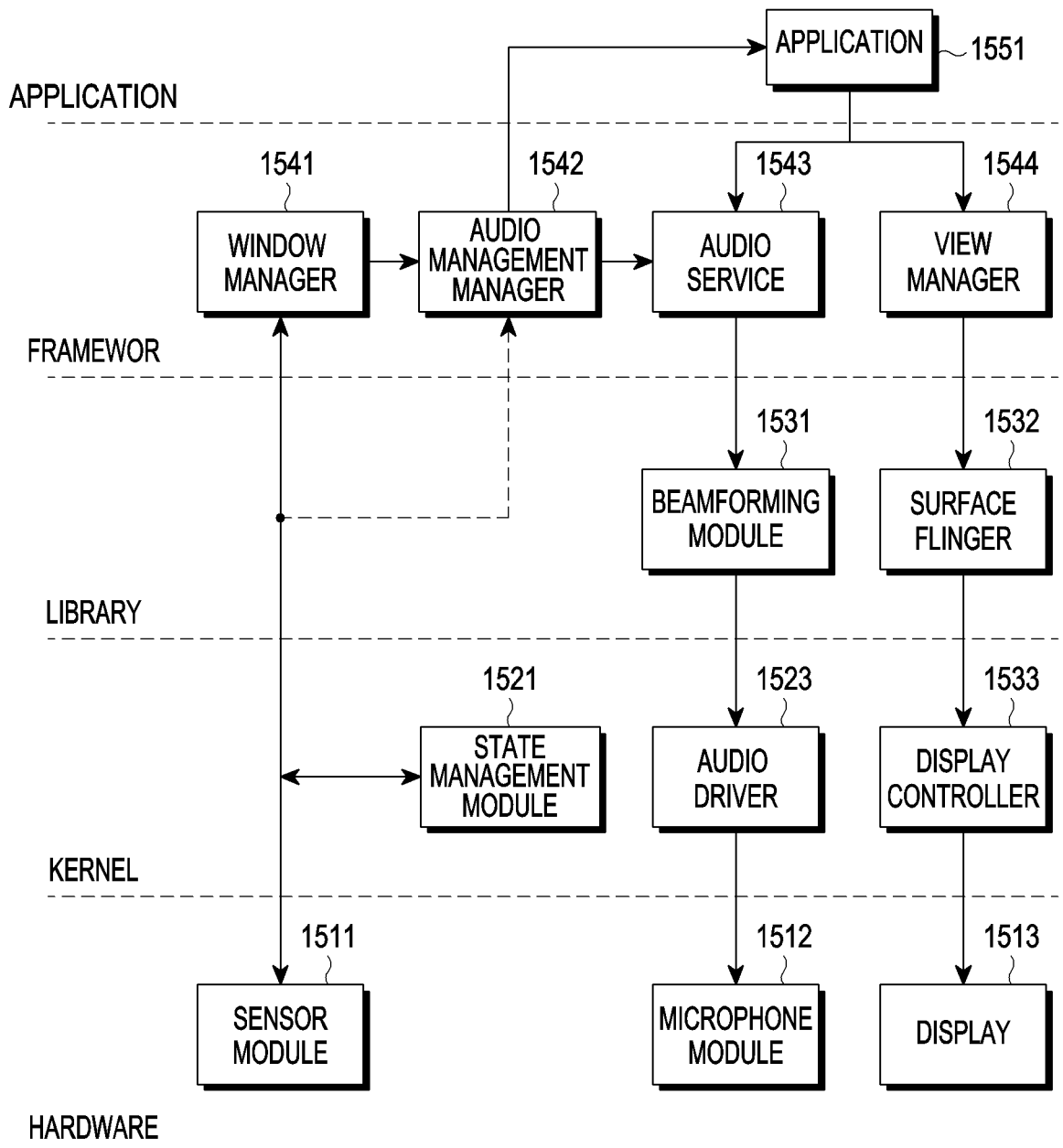
FIG. 15 is a block diagram showing a detailed configuration of an electronic device according to an embodiment of the disclosure.

FIG. 15 is a block diagram showing a detailed configuration of an electronic device according to an embodiment of the disclosure.

Referring to FIG. 15, the electronic device 101 may include: a hardware layer including a sensor module 1511, a microphone module 1512, and a display 1513; a kernel layer including a state management module 1521, an audio driver 1523, and a display controller 1533; a library layer including a beamforming module 1531 and a surface flinger 1532; a framework layer including a window manager 1541, an audio management manager 1542, an audio service 1543, and a view manager 1544; and an application layer including applications 1551.

The kernel layer, the library layer, the framework layer, and the application layer may be stored in an instruction type in a memory such that a processor performs the operation of a corresponding configuration in execution.

The applications 1551 can draw at least one layer based on the resolution of the second display region of the display 1513. In an embodiment, the applications 1551 can draw at least one layer based on the resolution of the second display region of the display 1513 using a drawing library (e.g., view).

When a state change of the electronic device 101 is recognized through the sensor module 1511, the window manager 1541 can transmit the information of the display region corresponding to the changed state of the electronic device 101 to the applications 1551. For example, when a state change of the electronic device 101 is recognized, it is possible to transmit the information of the display region corresponding to the changed state of the electronic device 101 to an application in which continuity is configured of the applications that are current executed.

The view manager 1544 may be a program for drawing at least one layer, based on the resolution of the second display region of the display 1513. In an embodiment, the applications 1551 can draw at least one layer based on the resolution of the second display region of the display 1513 using the view manager 1544.

The audio management manager 1542 can perform management of a screen, beamforming, and an audio, based on a folding angle when information about a change of a folding state is received through the state management module 1521. For example, it is possible to configured audio (e.g., beamforming) related to an application program, which is being executed, based on the folding angle of the display 1513, and informs the applications 1551 and the framework of the audio service 1543 of the audio, thereby being able to reconfiguring screen and audio states.

The library layer, which is a Hardware Abstraction Layer (HAL), may mean an abstracted layer between a plurality of hardware modules included in the hardware layer and the software of the electronic device 101. The surface flinger 1532 can combine a plurality of layers. In an embodiment, the surface flinger 1532 can provide data showing a plurality of combined layers to the display controller 1533.

The kernel layer may include various drivers for controlling various hardware modules included in the electronic device 101. The kernel layer may include a sensor driver (not shown) including an interface module controlling a sensor controller connected with a sensor. The display controller 1333 may correspond to a display driving circuit (e.g., the DDI 1350 of FIG. 13). In an embodiment, the configurations of the processor may be implemented in a hardware type or a software type.

Figure 16:
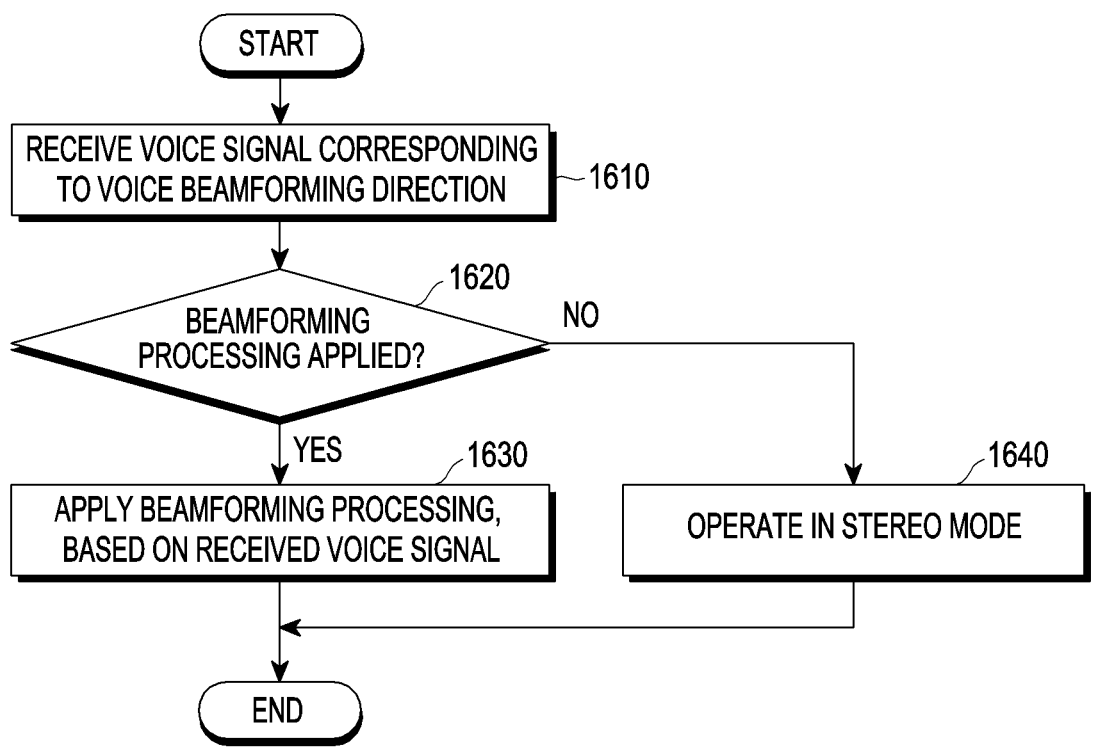
FIG. 16 is a flowchart showing an embodiment of an operation of an electronic device according to an embodiment of the disclosure.

FIG. 16 is a flowchart showing an embodiment of an operation of an electronic device according to an embodiment of the disclosure.

Referring to FIG. 16, the electronic device 101 can receive a voice signal corresponding to a voice beamforming direction while the voice recording mode is performed in operation 1610.

According to various embodiments, the electronic device 101 can determine whether beamforming processing is applied in accordance with the current folding state in operation 1620. For example, when the interview mode is performed in the unfolded state of the electronic device 101, it is possible to determine that beamforming processing is being applied and it is possible to apply beamforming processing, based on the voice signal received in operation 1630.

When the electronic device 101 determines that beamforming processing is not applied in accordance with the current folding state in operation 1620, the electronic device 101 can operate in the stereo mode in operation 1640.

Figure 17:
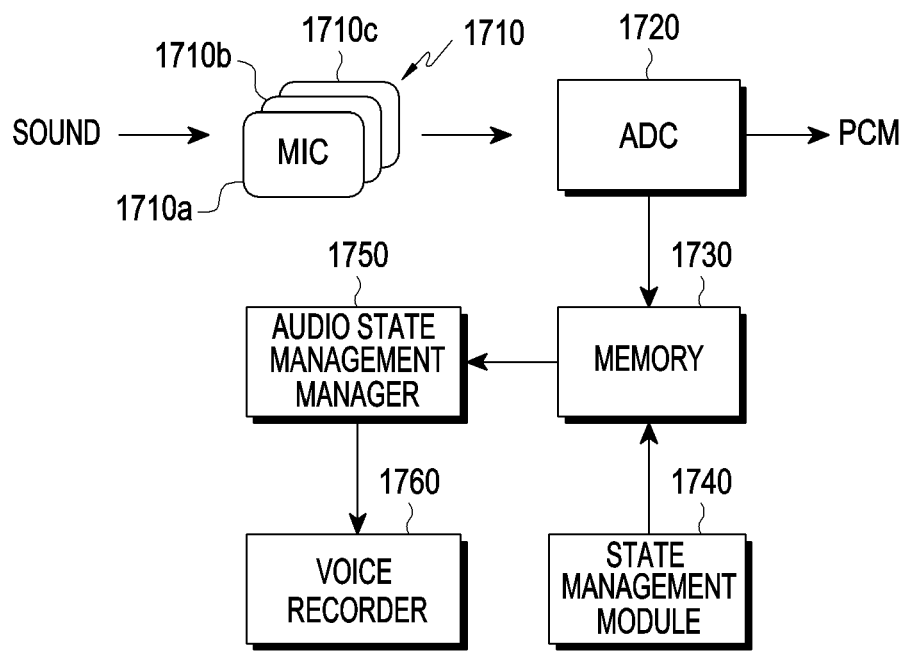
FIG. 17 is a block diagram showing a detailed configuration of an electronic device according to an embodiment of the disclosure.

FIG. 17 is a block diagram showing a detailed configuration of an electronic device according to an embodiment of the disclosure. The electronic device 101 can receive a voice signal corresponding to a voice beamforming direction.

Referring to FIG. 17, a voice (sound) made by a teller can be input to a plurality of microphones (e.g., the first microphone 1710a, the second microphone 1710b, and the third microphone 1710c).

The voice (sound) input through the microphones 1710 can be converted into an electrical signal through an Analog-Digital Converter (ADC) 1720. According to various embodiments, a Pulse Code Modulation (PCM) sound can be extracted when the voice (sound) is processed through the ADC 1720. For example, the ADC 1720 can digitalize and transmit the voice (sound) of a teller to a voice recorder 1760 by processing the signal in a PCM type through a third-party module (e.g., a PCM sound module, a PCM tone generator, or the like), and the processor 120 can perform recording through the voice recorder 1760.

According to various embodiments, the processor 120 can extract a folding angle at which the voice (sound) is input through the state management module 1740. The extracted angle can be stored in a system memory 1730.

According to various embodiments, the system memory 1730 can transmit the stored angle to the voice recorder 1760 in real time through the audio state management manager 1750.

According to various embodiments, the processor 120 can perform recording, based on the PCM sound transmitted through the voice recorder 1760, and can analyze the directionality of the PCM sound using the folding angle transmitting during recording. The processor 120 can show teller information on the display, based on the analyzed directionality. The directionality can be synchronized with the PCM sound and stored in the memory 1730.

Figure 18:
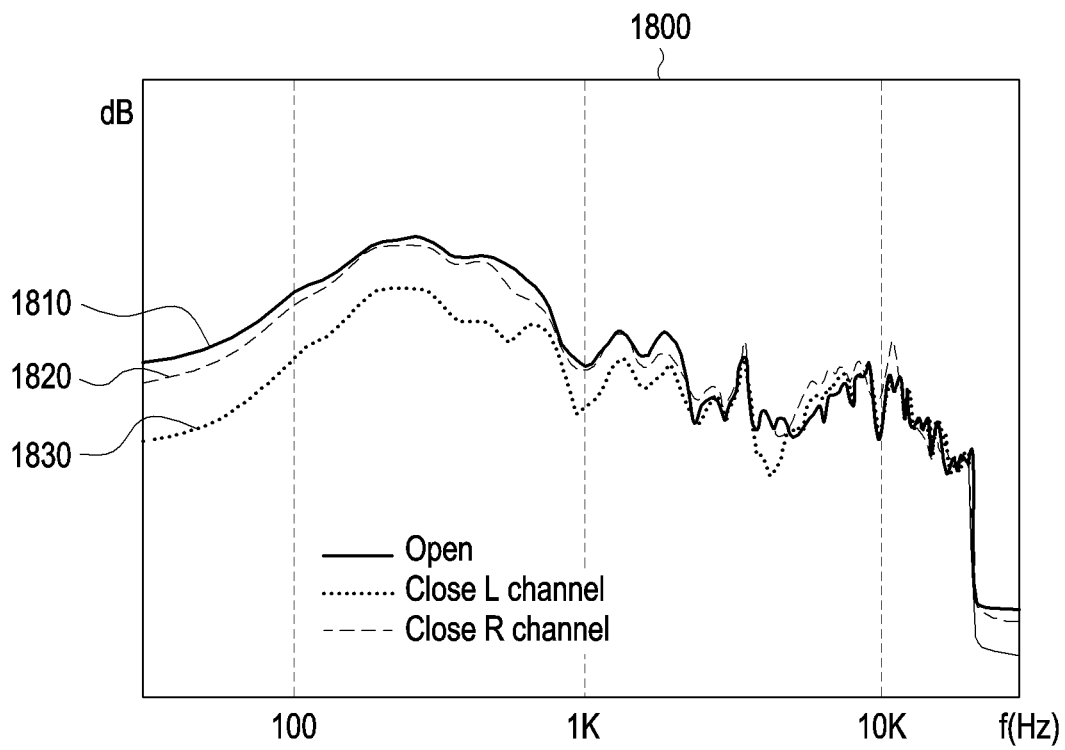
FIG. 18 is a graph showing audio signals received in a folded state of an electronic device according to an embodiment of the disclosure.

FIG. 18 is a graph 1800 showing audio signals received in a folded state of an electronic device according to an embodiment of the disclosure.

Figure 19A:
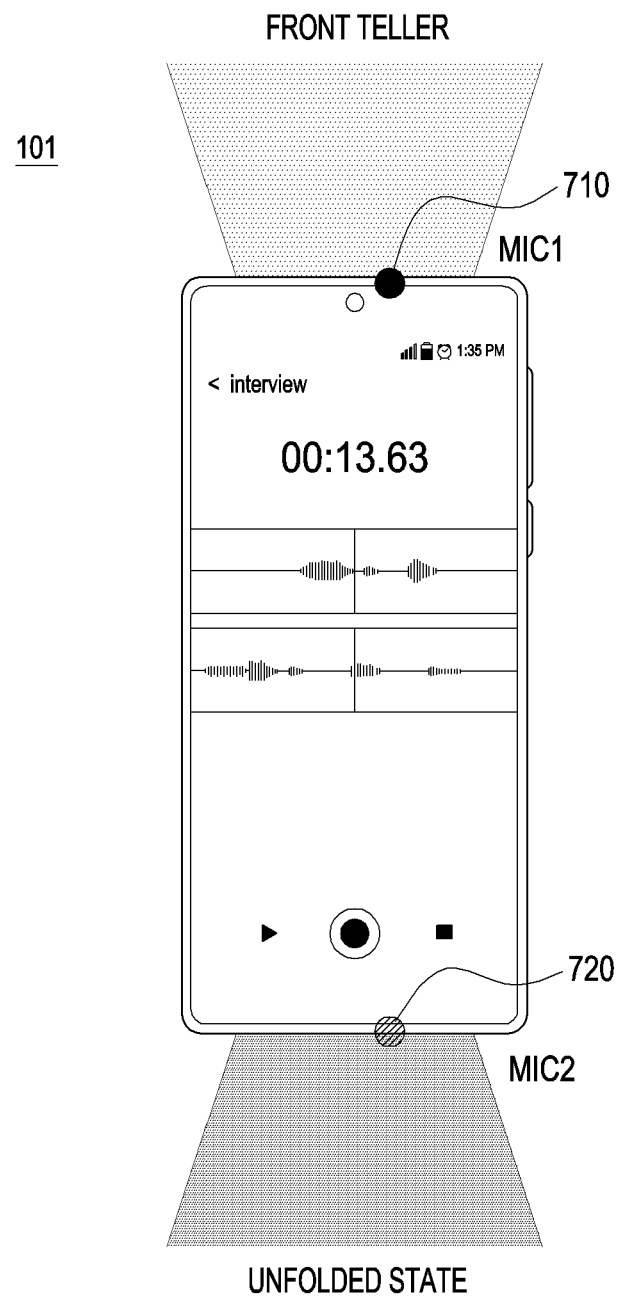
FIG. 19A is a view showing voice beamforming in an unfolded state of an electronic device according to an embodiment of the disclosure.

FIG. 19A is a view showing voice beamforming in an unfolded state of an electronic device according to an embodiment of the disclosure.

Figure 19B:
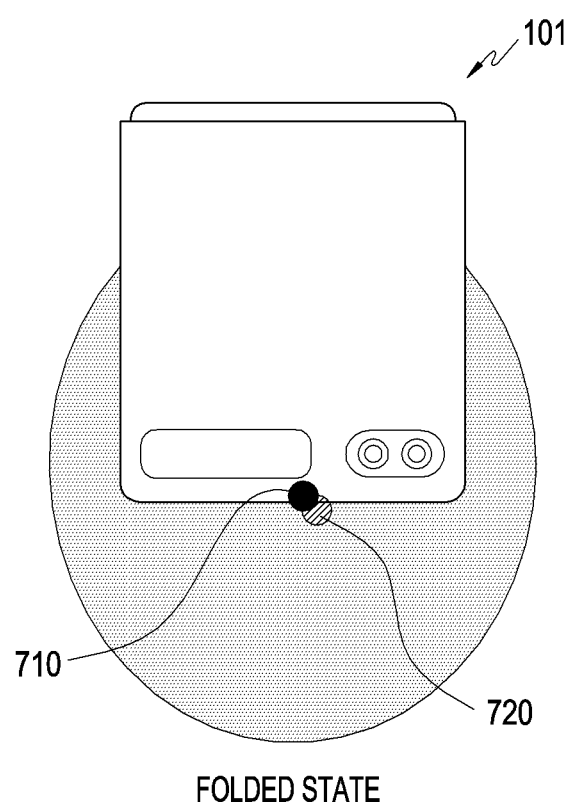
FIG. 19B is a view showing a voice reception direction in a folded state of an electronic device according to an embodiment of the disclosure.

FIG. 19B is a view showing a voice reception direction in a folded state of an electronic device according to an embodiment of the disclosure.

Referring to FIG. 18, a signal 1810 to which voice beamforming is applied can be received while the interview mode is performed in the unfolded state (e.g., the open state) of the electronic device 101 in accordance with various embodiments. Further, when the electronic device 101 is folded (e.g., the close state), the voice beamforming that is being applied is stopped and stereo-recorded signals 1820 and 1830 (e.g., a close R channel and a close L channel) can be received.

Referring to FIG. 19A, when the interview mode is performed in the unfolded state of the electronic device 101, voice beamforming is applied, the first microphone 710 can receive a voice of a front teller, and the second microphone 720 can receive a voice signal of a rear teller.

Referring to FIG. 19B, even though the interview mode is being performed in the folded state of the electronic device 101, the stereo function of the mono function can be configured without voice beamforming applied.

Figure 20:
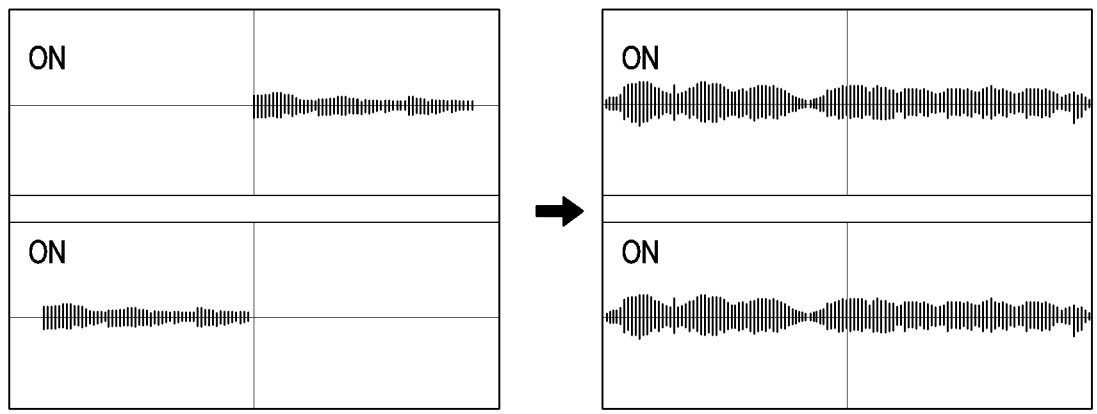
FIG. 20 is a graph showing audio signals received when a folding state of an electronic device according to an embodiment of the disclosure.

FIG. 20 is a graph showing audio signals received when a folding state of an electronic device according to an embodiment of the disclosure.

Referring to FIG. 20, voice beamforming can be applied in a unfolded state of the electronic device 101, as in the left graph, and when the electronic device 101 is folded, the operation of changing into the stereo function can be performed as in the right graph.

According to an embodiment, when the electronic device 101 is folded in accordance with sensing of folding while a voice is recorded in the interview mode, the beamforming processing for the interview mode can be bypassed and the electronic device 101 can be operated in the same mode as when it is folded during stereo recording. That is, voice recording keeps being performed even if the electronic device is folded in the interview mode, but recording may be performed in the stereo mode not beam processing of the interview mode.

Figure 21:
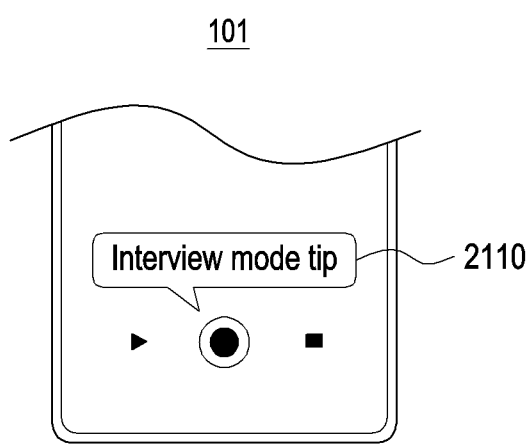
FIG. 21 is a view showing a UI displayed in a screen of an electronic device according to an embodiment of the disclosure.

FIG. 21 is a view showing a UI displayed in a screen of an electronic device according to an embodiment of the disclosure. According to various embodiments, when the specific voice recording mode and the folding state information satisfy a predetermined condition (e.g., when it is determined that the electronic device 101 is in the folded state in the interview mode), an image for guiding a change of the folding state can be displayed through the display.

Referring to FIG. 21, the electronic device 101 can perform recording with the screen unfolded in the interview mode, and when the screen is folded, information 2110 related to the interview mode can be provided through the screen to a user due to deterioration of the interview mode. For example, the electronic device 101 can show "Record in unfolded state for best quality" on the screen.

Figure 22A:
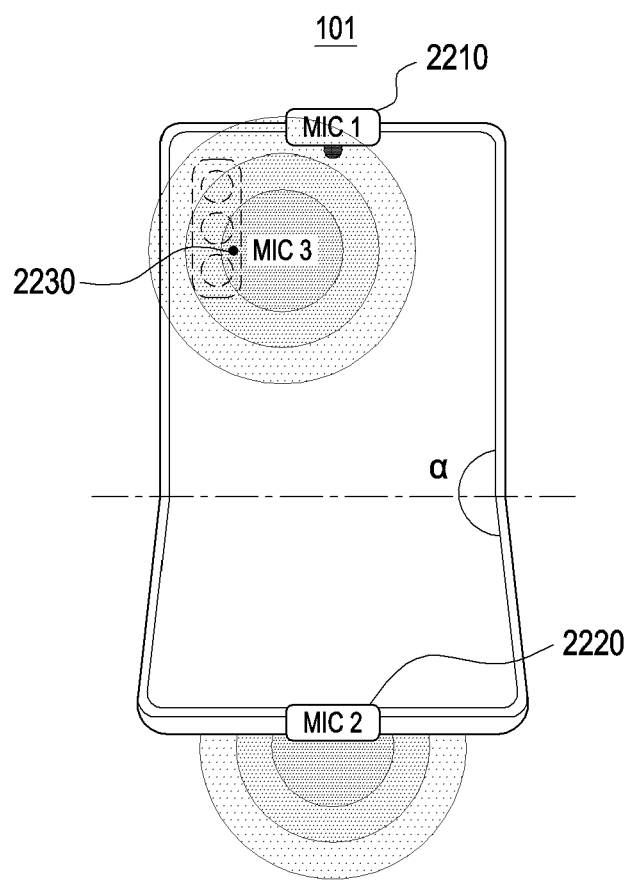
FIG. 22A is a view showing an example in which three microphones are included in an electronic device according to an embodiment of the disclosure.

FIG. 22A is a view showing an example in which three microphones are included in the electronic device according to an embodiment of the disclosure.

Figure 22B:
FIG. 22B is a view showing an example of using an interview mode of an electronic device according to an embodiment of the disclosure.

FIG. 22B is a view showing an example of using the interview mode of the electronic device according to an embodiment of the disclosure.

Referring to FIGS. 22A and 22B, as described above, a first microphone 2210 may be disposed in the first housing structure 310 and a second microphone 2220 may be disposed in the second housing structure 320. According to various embodiments, a third microphone 2230 may be disposed in the rear camera module.

According to various embodiments, in the unfolded state of the electronic device 101, recording in the interview mode can be performed through the first microphone 2210 at the upper end and the second microphone 2220 at the lower end. Further, when the electronic device 101 is changed in to the half folded state, as shown in the figures, while recording is performed in the interview mode (e.g., the angle between the first housing structure 310 and the second housing structure 320 is $\alpha°$, $91° < \alpha° < 130°$), recording may be possible in the interview mode through the third microphone 2230.

Figure 23:
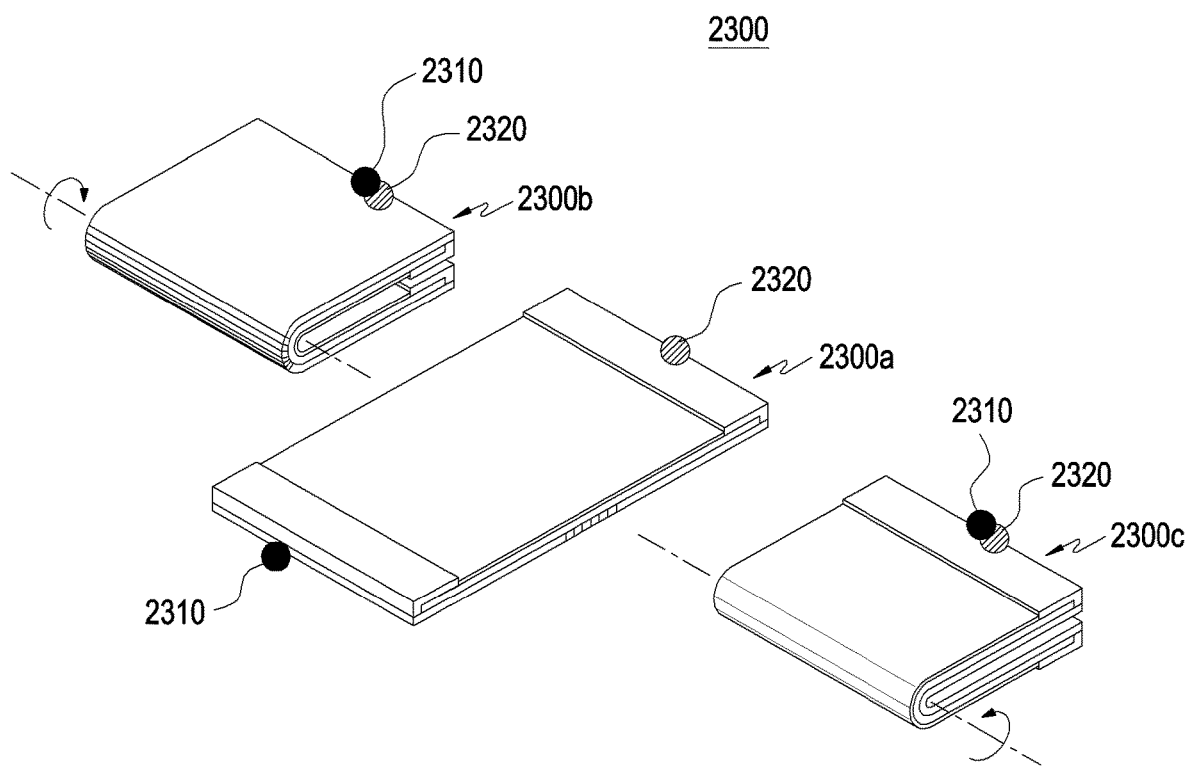
FIG. 23 is a view showing a flexible display including a plurality of microphones in an electronic device according to an embodiment of the disclosure.

FIG. 23 is a view showing a flexible display including a plurality of microphones in an electronic device according to an embodiment of the disclosure.

Referring to FIG. 23, it is possible to determine whether beamforming is applied in accordance with the folding state of a foldable device 2300 that can be folded both inward and outward (e.g., the electronic device 101 of FIG. 1). For example, when the electronic device 2300 is folded inward or outward into the folded states 2300b or 2300c from the unfolded state 2300a, the first microphone 2310 and the second microphone 2320 may overlap each other. For example, when the first microphone 2310 and the second microphone 2320 overlap each other, the audio management manager (e.g., the audio management manager 1542 of FIG. 15) may be controlled to bypass beamforming processing.

Figure 24:
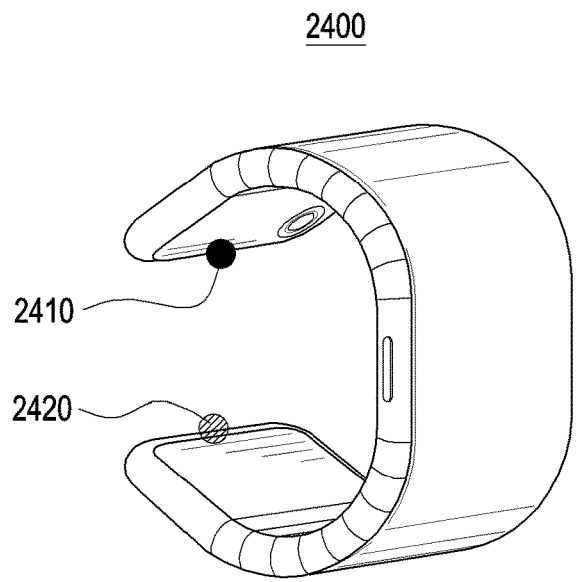
FIG. 24 is a view showing a flexible display including a plurality of microphones in an electronic device according to an embodiment of the disclosure.
Figure 25A:
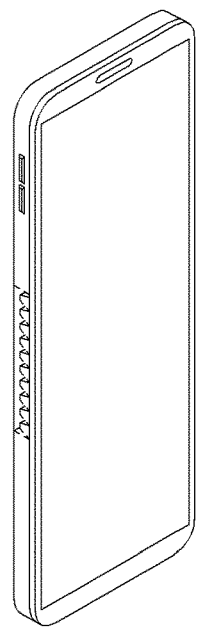
FIGS. 25A, 25B, 25C, 25D, and 25E are views showing a flexible display including a plurality of microphones in an electronic device according to various embodiments of the disclosure.
Figure 25B:
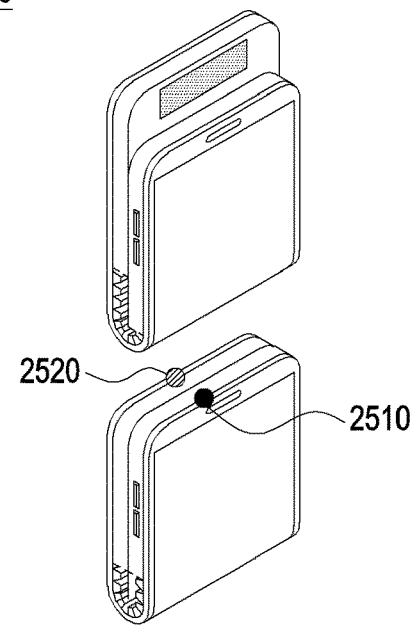
Figure 25C:
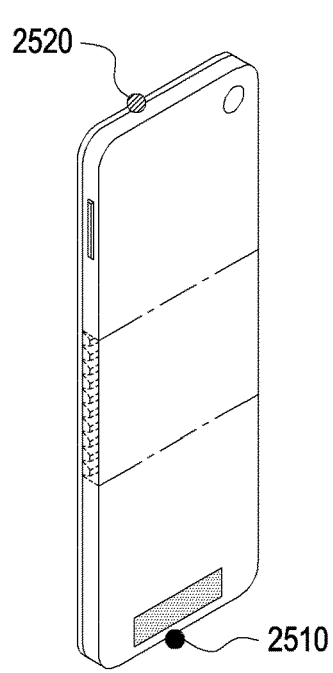
Figure 25D:
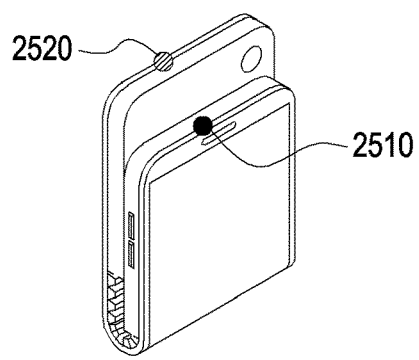
Figure 25E:
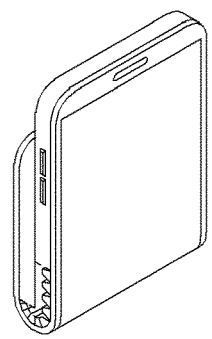

FIG. 24 is a view showing a flexible display including a plurality of microphones in an electronic device according to an embodiment of the disclosure.

Referring to FIG. 24, when a first microphone 2410 and a second microphone 2420 are positioned close to each other in a wrist-wearing electronic device 2400 (e.g., the electronic device 101 of FIG. 1), an audio management manager (the audio management manager 1542 of FIG. 15) may be controlled to bypass a configured voice beamforming function.

FIGS. 25A, 25B, 25C, 25D and 25E are views showing a flexible display including a plurality of microphones in an electronic device according to various embodiments of the disclosure.

Referring to FIGS. 25A, 25B, 25C, 25D, and 25E, when an electronic device 2500 that slides to change the folding state (e.g., a rollable electronic device) (e.g., the electronic device 101 of FIG. 1) is rolled and a first microphone 2510 and a second microphone 2520 are positioned close to each other, an audio management manager (the audio management manager 1542 of FIG. 15) may be controlled to bypass a configured beamforming function.

FIGS. 26A, 26B, 26C, 26D, and 26E are views showing a flexible display including a plurality of microphones in an electronic device according to various embodiments of the disclosure.

Referring to FIGS. 26A, 26B, 26C, 26D, and 26E, when a first microphone 2610 and a second microphone 2620 are positioned close to each other or a third microphone 2630 and a fourth microphone 2640 are positioned close to each other in an electronic device 2600 that can be folded inward and outward in three operations (e.g., the electronic device 101 of FIG. 1), an audio management manager (the audio management manager 1542 of FIG. 15) may be controlled to bypass a configured beamforming function.

Figures 26A, 26B:
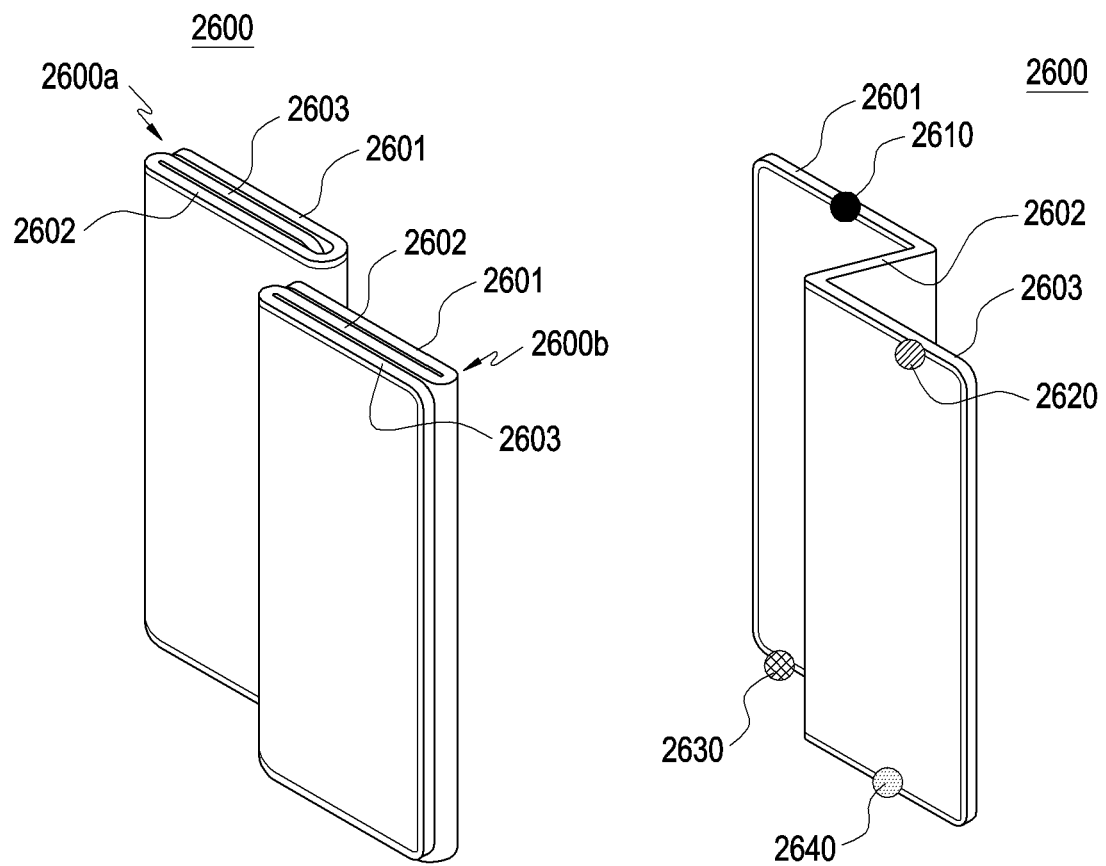
FIGS. 26A, 26B, 26C, 26D, and 26E are views showing flexible displays including a plurality of microphones in an electronic device according to various embodiments of the disclosure.
Figure 26C:
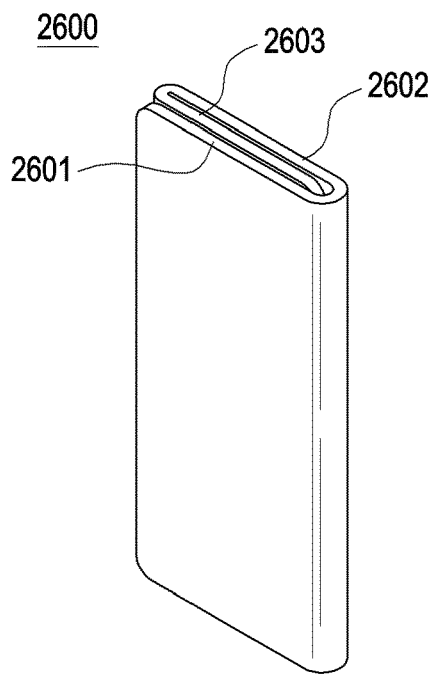
Figure 26D:
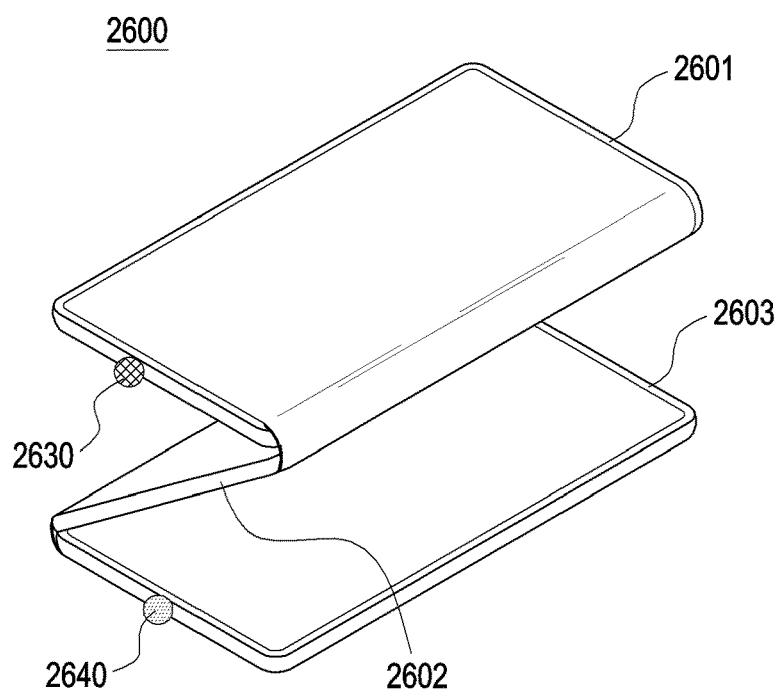

Referring to FIGS. 26A, 26B, 26C, 26D, and 26E, the housing of the electronic device 2600 may include a first housing structure 2601, a second housing structure 2602, and a third housing structure 2603. The housing structures 2601, 2602, and 2603 can form a foldable electronic device by rotating with respect to each other. Referring to FIG. 26A, the electronic device 2600 can be folded inward into an inward folded state 2600a or can be folded outward into an outward folded state 2600b. Referring to FIGS. 26B, 26C, and 26D, when the electronic device 2600 is unfolded half, the first microphone 2610 and the second microphone 2620 may be spaced a predetermined distance apart from each other, and the third microphone 2630 and the fourth microphone 2640 may be spaced a predetermined distance apart from each other. According to various embodiments, when the electronic device 2600 is changed into the inward folded state 2600a of FIG. 26C from the unfolded state of FIG. 26B and the first microphone 2610 and the second microphone 2620 are positioned closed to each other or the third microphone 2630 and the fourth microphone 2640 are positioned close to each other, the electronic device 2600 can control the audio management manager (e.g., the audio management manager 1524 of FIG. 15) to bypass a configured beamforming function.

Figure 26E:
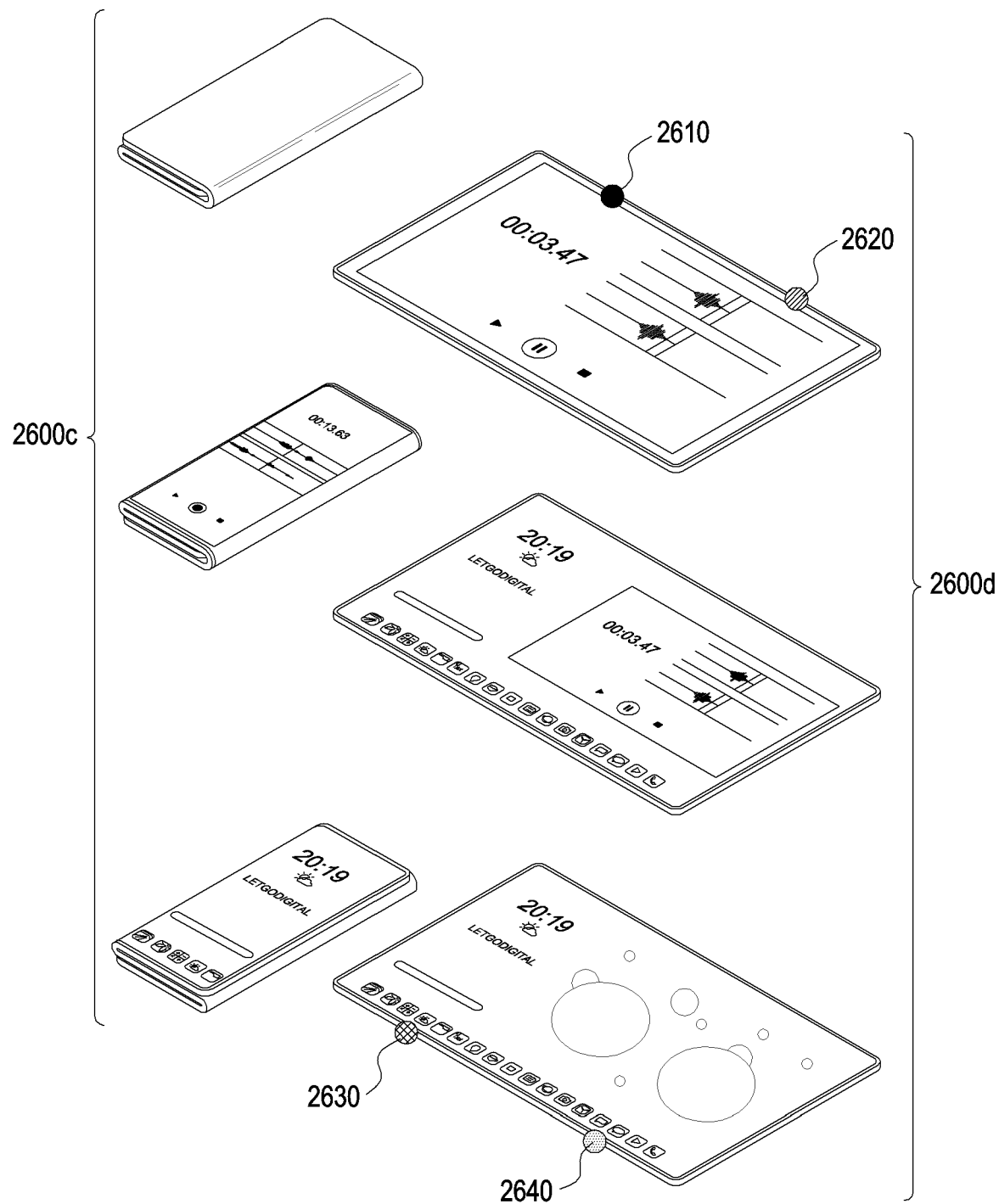

Referring to FIG. 26E, the electronic device 2600 can be converted into a fully folded state 2600c or a fully unfolded state 2600d. When the electronic device 2600 is in the fully unfolded state 2600d, the first microphone 2610 and the second microphone 2620 may be spaced a predetermined distance apart from each other, and the third microphone 2630 and the fourth microphone 2640 may be spaced a predetermined distance apart from each other.

FIGS. 27A, 27B, 27C, 27D, 27E, and 27F are views showing a flexible display including a plurality of microphones in an electronic device according to various embodiments of the disclosure.

Referring to FIGS. 27A, 27B, 27C, 27D, 27E, and 27F, when a first microphone 2710 and a second microphone 2720 are positioned close to each other in an electronic device 2700 that can be folded by folding both ends inward (e.g., the electronic device 101 of FIG. 1), an audio management manager (the audio management manager 1542 of FIG. 15) may be controlled to bypass a configured beamforming function.

Figure 27A:
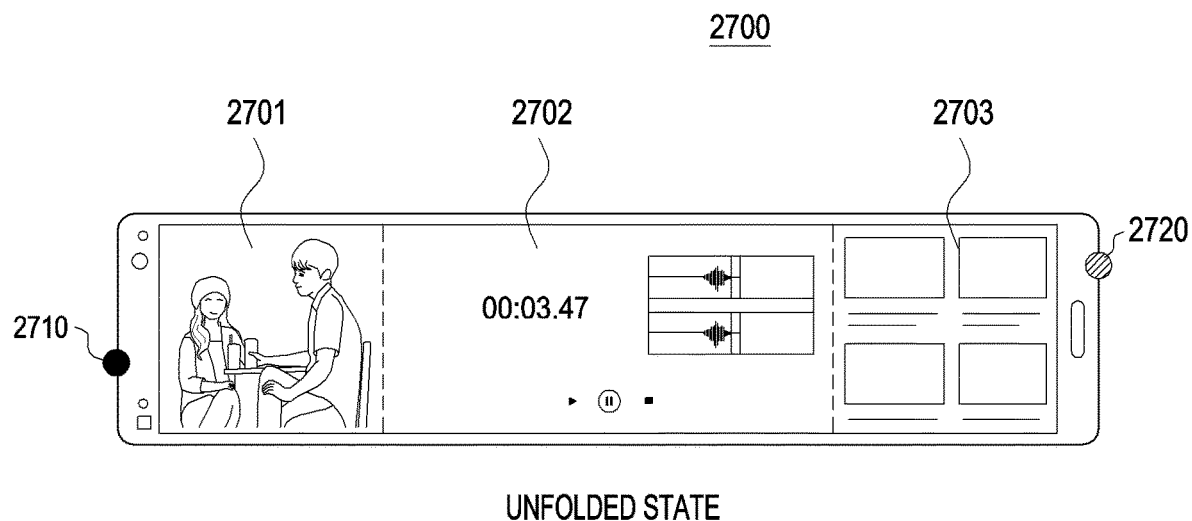
FIGS. 27A, 27B, 27C, 27D, 27E, and 27F are views showing flexible displays including a plurality of microphones in an electronic device according to various embodiments of the disclosure.
Figure 27B:
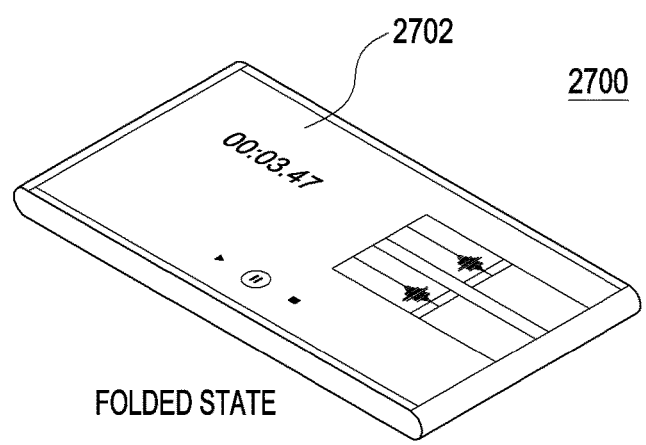

Referring to FIGS. 27A, 27B, 27C, 27D, 27E, and 27F, the housing of the electronic device 2700 may include a first housing structure 2701, a second housing structure 2702, and a third housing structure 2703. The housing structures 2701, 2702, and 2703 can form a foldable electronic device by rotating with respect to each other. Referring to FIGS. 27A and 27B, the electronic device 2700 can be fully unfolded, or can be folded inward by folding the first housing structure 2710 and the third housing structure 2703 over the second housing structure 2702.

Figure 27C:
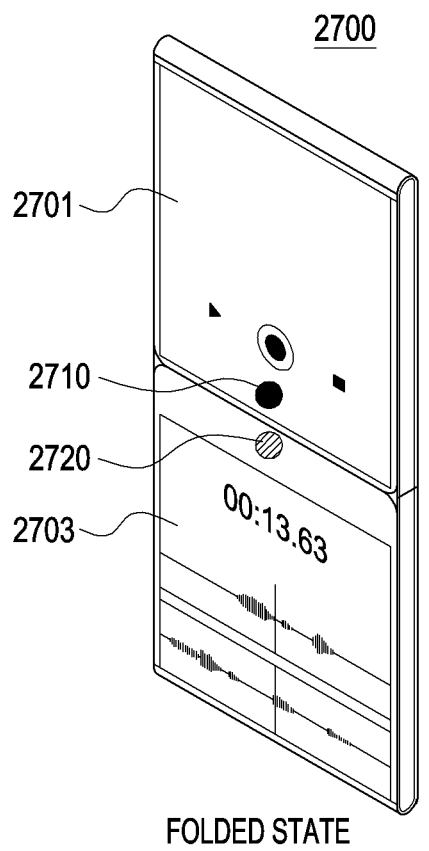
Figure 27D:
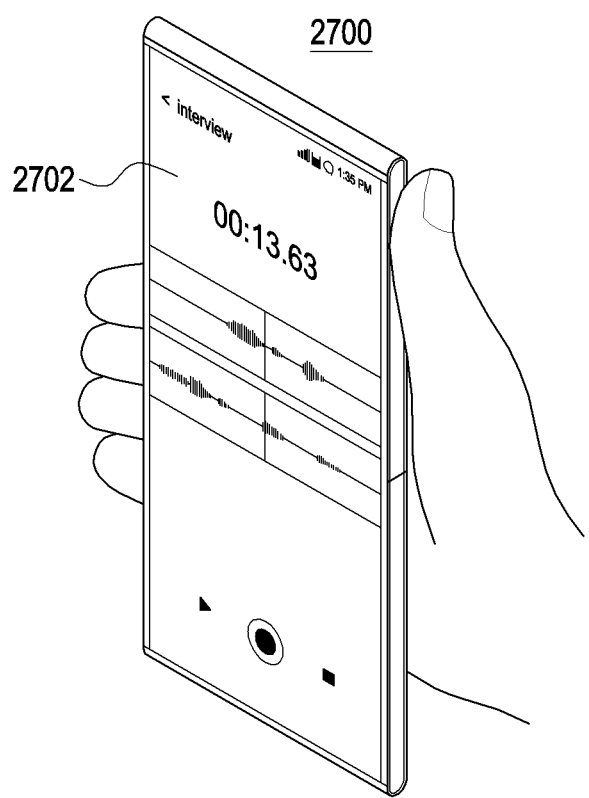

According to various embodiments, referring to FIGS. 27C and 27D, when the electronic device is folded inward, the first microphone 2710 and the second microphone 2720 are positioned close to each other and the electronic device 2700 can control an audio management manager (the audio management manager 1542 of FIG. 15) to bypass a configured beamforming function.

Figure 27E:
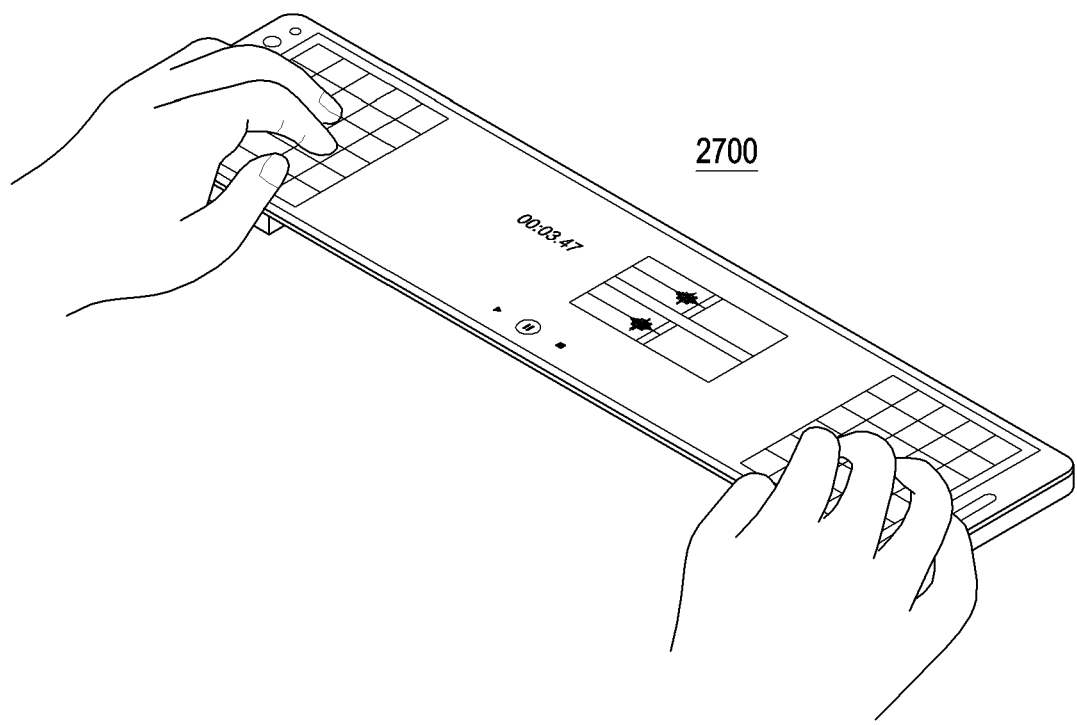
Figure 27F:
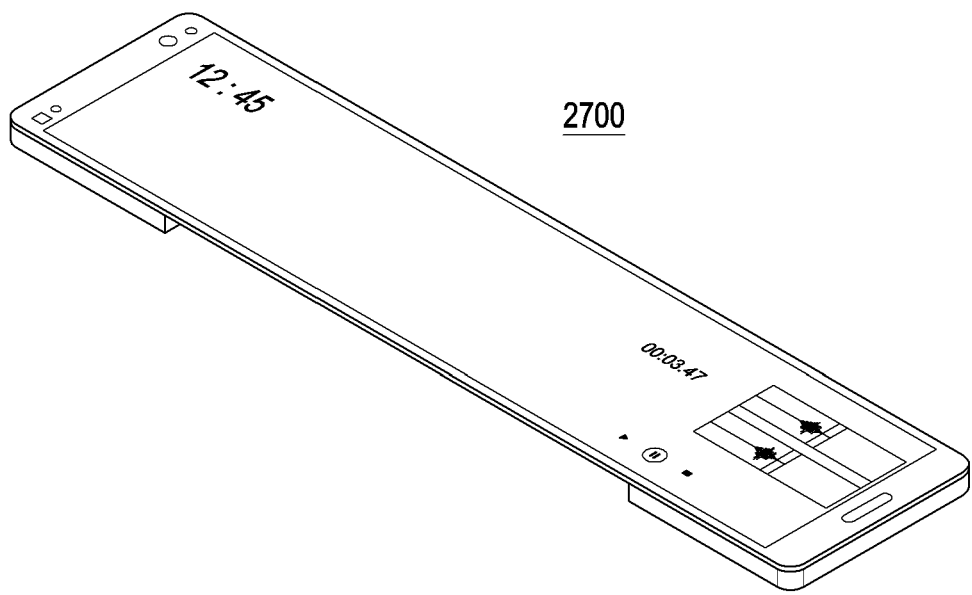

According to various embodiments, referring to FIGS. 27E and 27F, the electronic device 2700 can be fully unfolded. When the electronic device 2700 is fully unfolded, the first microphone 2710 and the second microphone 2720 may be spaced a predetermined distance apart from each other.

FIGS. 28A, 28B, 28C, and 28D are views showing a flexible display including a plurality of microphones in an electronic device according to various embodiments of the disclosure.

Referring to FIGS. 28A, 28B, 28C, and 28D, when a first microphone 2810 and a second microphone 2820 are positioned close to each other in an electronic device 2800 that can be folded inward and outward in four operations (e.g., the electronic device 101 of FIG. 1), an audio management manager (the audio management manager 1542 of FIG. 15) may be controlled to bypass a configured beamforming function.

Figure 28A:
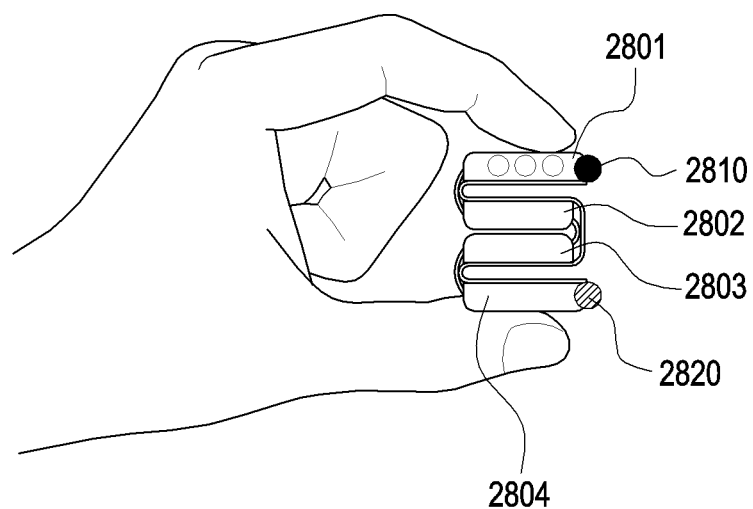
FIGS. 28A, 28B, 28C, and 28D are views showing flexible displays including a plurality of microphones in an electronic device according to various embodiments of the disclosure.
Figure 28B:
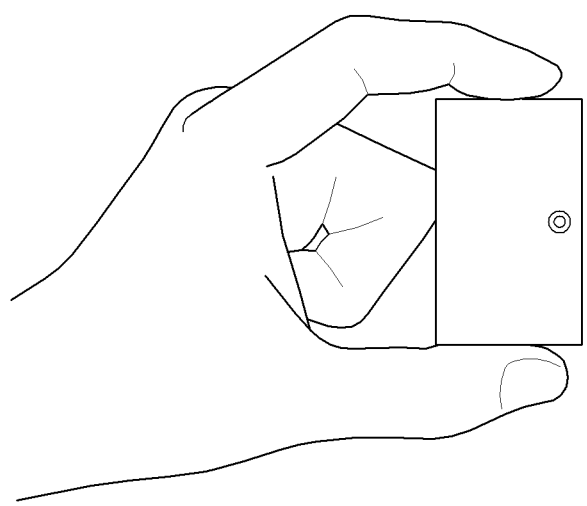

Referring to FIGS. 28A, 28B, 28C, and 28D, the housing of the electronic device 2800 may include a first housing structure 2801, a second housing structure 2802, a third housing structure 2803, and a fourth housing 2804. The housing structures 2801, 2802, 2803, and 2804 can form a foldable electronic device by rotating with respect to each other. Referring to FIGS. 28A and 28B, the electronic device 2800 can be folded by fully folding the first housing structure 2801 to the fourth housing structure 2804.

Referring to FIGS. 28A and 28B, when the electronic device 2800 is folded, the first microphone 2810 and the second microphone 2820 are positioned close to each other and the electronic device 2800 can control an audio management manager (the audio management manager 1542 of FIG. 15) to bypass a configured beamforming function.

Figure 28C:
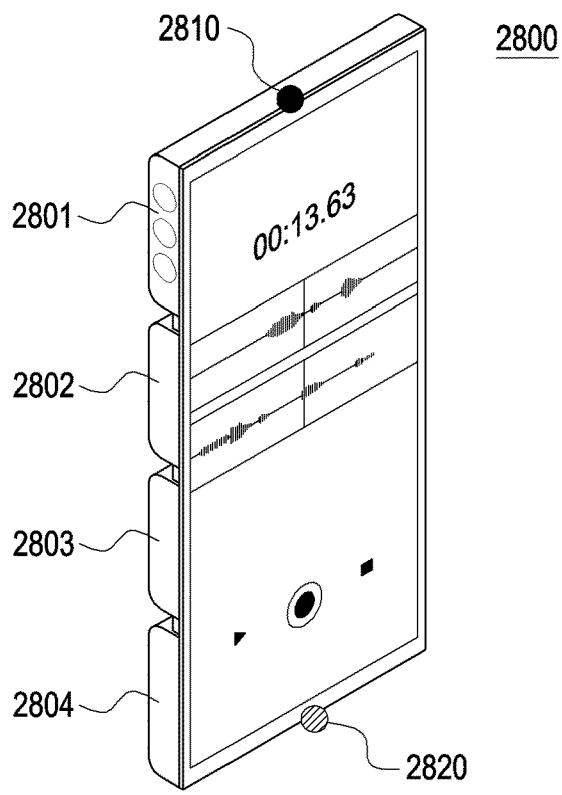
Figure 28D:
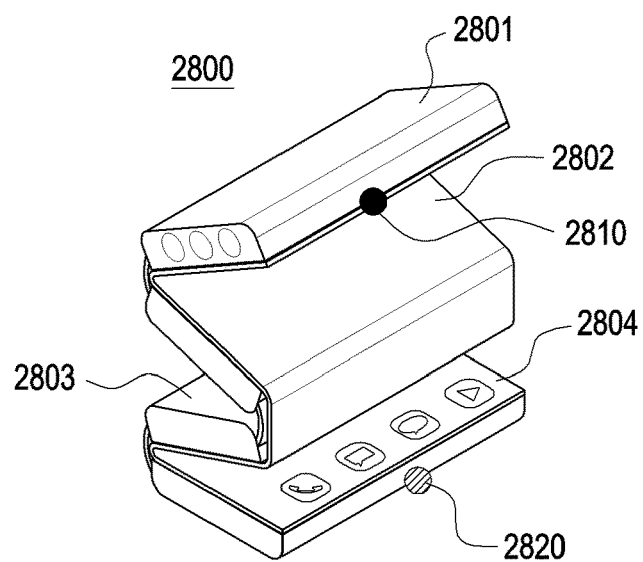
Figure 29K:
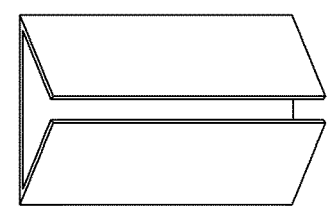
FIGS. 29A, 29B, 29C, 29D, 29E, 29F, 29G, 29H, 29I, 29J, and 29K are views showing flexible displays including a plurality of microphones in an electronic device according to various embodiments of the disclosure.
Figure 29J:
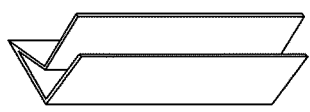
Figure 29I:
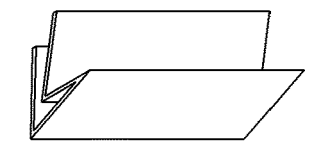
Figure 29H:
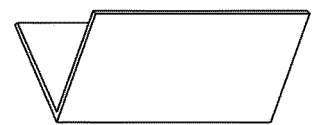
Figure 29G:
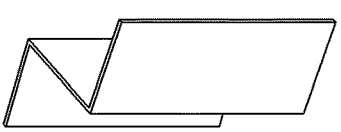
Figure 29F:
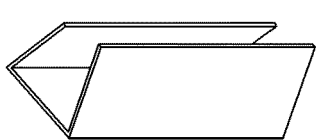
Figure 29E:
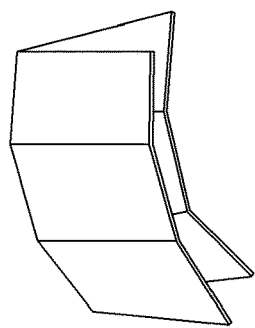
Figure 29D:
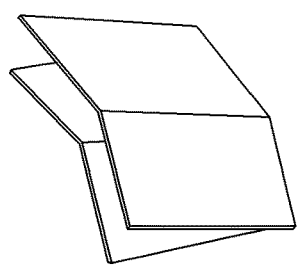
Figure 29C:
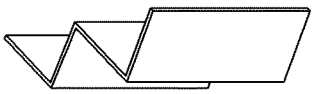
Figure 29B:
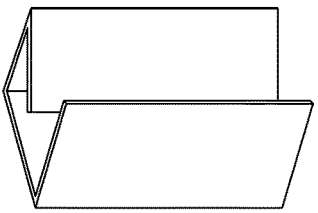
Figure 29A:
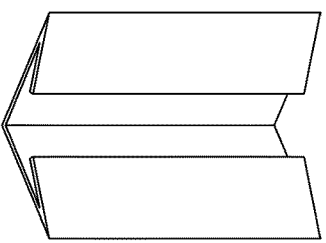

Referring to FIG. 28C, the electronic device 2800 can be fully unfolded. When the electronic device 2800 is fully unfolded, the first microphone 2810 and the second microphone 2820 may be spaced a predetermined distance apart from each other. Referring to FIG. 28D, the electronic device 2800 can maintain a folding angle at a predetermined level. When the electronic device 2800 maintains a folding angle at a predetermined level, the first microphone 2810 and the second microphone 2820 may be spaced a predetermined distance apart from each other and the recording function configuration may be adjusted in consideration of the predetermined distance.

FIGS. 29A through 29K are views showing various example of an electronic device including at least two or more housing structure and a flexible display according to various embodiments of the disclosure. According to various embodiments, an electronic device (e.g., the electronic device 101 of FIG. 1) may include two or more housing structure rotatably connected to each other, and a flexible display.

According to various embodiments, the flexible display may be disposed on the two or more housings and can be curved in accordance with the rotation state of the housing structures.

According to various embodiments, the electronic device may be formed in various types in accordance with the two or more housing structure and the flexible display included in the electronic device and the rotation state of the housing structures.

Referring to FIGS. 29A through 29K, may include a type in which two regions are defined in an electronic device (e.g., a flexible display) (half fold), a type in which three regions are defined in an electronic device (e.g., a flexible display) (e.g., tri fold, Z fold, single open gate fold), a type in which four regions are formed in an electronic device (e.g., a flexible display) (e.g., double parallel reverse fold, double parallel fold, double gate fold, roll fold, accordion fold, half fold then half fold), and a type in which over four regions are formed (e.g., half fold then tri fold). An electronic device may include housing structure rotatably connected, and a flexible display, in which the housing structures can be rotated in the corresponding shape.

An electronic device and an operation method thereof according to various embodiments may be referred to for not only an electronic device including two housing structures, but also, as shown in FIGS. 29A through 29K, an electronic device including three or more housing structures and a flexible display.

The electronic device according to various embodiments may include at least one microphone in each of the two housing structures, and as shown in FIGS. 29A through 29K, the distance between the microphones in the housing structures may change when the housing structures are folded into an unfolded state or a folded state. According to various embodiments, a recording function configuration may be adjusted in consideration of the distance between the microphones in the housing structures.

An electronic device according to any one of various embodiments includes: a first housing structure including a first microphone; a second housing structure including a second microphone and foldably coupled to the first housing structure; a sensor module disposed in the first housing structure and/or the second housing structure; and a processor disposed in the first housing structure and/or the second housing structure and operationally connected with the first microphone, the second microphone, and the sensor module, in which the processor may be configured to receive a folding event related to the first housing structure and the second housing structure through the sensor module while a specific voice recording mode is performed, to identify folding state information in response to receiving the folding event, to identify a recording function configuration related to the first microphone and the second microphone, based on the folding state information and the specific voice recording mode, and to perform recording by applying the identified recording function configuration.

According to various embodiments, the specific voice recording mode may include at least one of an interview mode configured to record a voice directed at a conversation counterpart, a normal mode, a voice memo mode, and a text mode.

According to various embodiments, the folding event includes an event occurring in correspondence to a change of a folding angle between the first housing structure and the second housing structure, and a distance between the first microphone and the second microphone may be changed by a change of the folding angle.

According to various embodiments, the folding state information may include an unfolded state of the electronic device, a folded state of the electronic device, and a state in which the folding angle between the first housing structure and the second housing structure is in a predetermined angle range.

According to various embodiments, the recording function configuration may include at least one of a beamforming function configuration, a stereo function configuration, and a mono function configuration.

According to various embodiments, the processor may control the recording function configuration to be changed from a voice beamforming function into a voice beamforming non-application function when the specific voice recording mode is the interview mode and the folding state information changes into the folded state from the unfolded state.

According to various embodiments, the electronic device may further include a display device, and the processor may control a screen for guiding a change of the folding state to be displayed through the display device when the specific voice recording mode and the folding state information satisfy a predetermined condition.

According to various embodiments, the processor may control an image for giving an instruction to change the folding state into the unfolded state to be displayed through the display device when the specific voice recording mode is the interview mode and the folding state information corresponds to the folded state.

A voice recording method of an electronic device including a first housing structure including a first microphone and a second housing structure including a second microphone and foldably connected to the first housing in accordance with any one of various embodiments may include: receiving a folding event related to the first housing structure and the second housing structure through a sensor module while a specific voice recording mode is performed; identifying folding state information in response to receiving the folding event; identifying a recording function configuration related to the first microphone and the second microphone, based on the folding state information and the specific voice recording mode; and performing recording by applying the identified recording function configuration.

According to various embodiments, the specific voice recording mode may include at least one of an interview mode configured to record a voice directed at a conversation counterpart, a normal mode, a voice memo mode, and a text mode.

According to various embodiments, the folding event includes an event occurring in correspondence to a change of a folding angle between the first housing structure and the second housing structure, and a distance between the first microphone and the second microphone may be changed by a change of the folding angle.

According to various embodiments, the folding state information may include an unfolded state of the electronic device, a folded state of the electronic device, and a state in which the folding angle between the first housing structure and the second housing structure is in a predetermined angle range.

According to various embodiments, the recording function configuration may include at least one of a beamforming function configuration, a stereo function configuration, and a mono function configuration.

According to various embodiments, the method may further include: changing the recording function configuration from a voice beamforming function into a voice beamforming non-application function when the specific voice recording mode is the interview mode and the folding state changes into the folded state from the unfolded state.

According to various embodiments, the method may control a screen for guiding a change of the folding state to be displayed through the display device when the specific voice recording mode and the folding state information satisfy a predetermined condition.

According to various embodiments, the method may further include displaying a screen for guiding a change of the folding state into the unfolded state through the display device when the specific voice recording mode is the interview mode and the folding state information corresponds to the folded state.

An electronic device according to any one of various embodiments includes: a first housing structure including a first microphone; a second housing structure including a second microphone and foldably coupled to the first housing structure; a sensor module disposed in the first housing structure and/or the second housing structure; and a processor disposed in the first housing structure and/or the second housing structure and operationally connected with the first microphone, the second microphone, and the sensor module, in which the processor may be configured to perform a recording operation by applying voice beamforming when a first voice recording mode is performed in an unfolded state of the electronic device, to receive a folding event related to the first housing structure and the second housing structure through the sensor module, to identify folding state information in response to receiving the folding event, and to perform the recording operation without applying the voice beamforming when the electronic device is identified as being in a folded state based on the folding state information.

According to various embodiments, the first voice recording mode may be an interview mode that records a voice directed at a conversation counterpart.

According to various embodiments, the folding event includes an event occurring in correspondence to a change of a folding angle between the first housing structure and the second housing structure, and a distance between the first microphone and the second microphone may be changed by a change of the folding angle.

According to various embodiments, the folding state information may include an unfolded state of the electronic device, a folded state of the electronic device, and an intermediate state in which the folding angle between the first housing structure and the second housing structure is in a predetermined angle range.

According to various embodiments, the electronic device may further include a display device, and the processor may control a screen for guiding a change of the folding state to be displayed through the display device when the folding state information satisfy a predetermined condition in the first voice recording mode.

According to various embodiments, when the electronic device transitions from the unfolded state to the folded state, one of the first microphone or the second microphone may turned off.

According to various embodiments, when the electronic device transitions from the folded state to the unfolded state, both the first microphone and the second microphone may be turned on.

when both the first microphone and the second microphone are turned on, the voice beamforming may be applied.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first housing structure comprising a first microphone;
   a second housing structure comprising a second microphone, the second housing structure foldably coupled to the first housing structure;
   a sensor module disposed in at least one of the first housing structure or the second housing structure; and
   at least one processor disposed in the at least one of the first housing structure or the second housing structure and operationally connected with the first microphone, the second microphone, and the sensor module, the at least one processor configured to:
      while a specific voice recording mode is performed, receive a folding event related to the first housing structure and the second housing structure through the sensor module,
      in response to receiving the folding event, identify folding state information,
      identify a recording function configuration related to the first microphone and the second microphone, based on the folding state information and the specific voice recording mode, and
      perform a recording operation by applying the identified recording function configuration,
   wherein the at least one processor is further configured to control the recording function configuration to be changed from a voice beamforming function into a voice beamforming non-application function when the specific voice recording mode is an interview mode and the folding state information changes into a folded state from an unfolded state.

2. The electronic device of claim 1, wherein the specific voice recording mode comprises at least one of an interview mode configured to record a voice directed at a conversation counterpart, a normal mode, a voice memo mode, or a text mode.

3. The electronic device of claim 1, wherein the folding event comprises an event occurring in correspondence to a change of a folding angle between the first housing structure and the second housing structure, and a distance between the first microphone and the second microphone is changed by a change of the folding angle.

4. The electronic device of claim 1, wherein the folding state information comprises the unfolded state of the electronic device, the folded state of the electronic device, and a state in which a folding angle between the first housing structure and the second housing structure is in a predetermined angle range.

5. The electronic device of claim 1, wherein the recording function configuration comprises at least one of a beamforming function configuration, a stereo function configuration, or a mono function configuration.

6. The electronic device of claim 1, further comprising a display device, wherein the at least one processor is further configured to control a screen for guiding a change of a folding state to be displayed through the display device when the specific voice recording mode and the folding state information satisfy a predetermined condition.

7. A voice recording method of an electronic device comprising a first housing structure comprising a first microphone and a second housing structure comprising a second microphone, the second housing structure foldably connected to the first housing structure, the voice recording method comprising:
   while a specific voice recording mode is performed, receiving a folding event related to the first housing structure and the second housing structure through a sensor module;
   in response to receiving the folding event, identifying folding state information;
   identifying a recording function configuration related to the first microphone and the second microphone, based on the folding state information and the specific voice recording mode; and
   performing recording by applying the identified recording function configuration,
   wherein the method further comprises controlling the recording function configuration to be changed from a voice beamforming function into a voice beamforming non-application function when the specific voice recording mode is an interview mode and the folding state information changes into a folded state from a unfolded state.

8. The voice recording method of claim 7, wherein the specific voice recording mode comprises at least one of an interview mode configured to record a voice directed at a conversation counterpart, a normal mode, a voice memo mode, or a text mode.

9. The voice recording method of claim 7, wherein the folding event comprises an event occurring in correspondence to a change of a folding angle between the first housing structure and the second housing structure, and a distance between the first microphone and the second microphone is changed by a change of the folding angle.

10. The voice recording method of claim 7, wherein the folding state information comprises the unfolded state of the electronic device, a folded state of the electronic device, and a state in which a folding angle between the first housing structure and the second housing structure is in a predetermined angle range.

11. The voice recording method of claim 7, wherein the recording function configuration comprises at least one of a beamforming function configuration, a stereo function configuration, or a mono function configuration.

12. The voice recording method of claim 7, further comprising changing the recording function configuration from a voice beamforming function into a voice beamforming non-application function when the specific voice recording mode is an interview mode and the folding state information changes into a folded state from the unfolded state.

13. The voice recording method of claim 7, wherein the method controls a screen for guiding a change of a folding state to be displayed through a display device when the specific voice recording mode and the folding state information satisfy a predetermined condition.

14. The voice recording method of claim 13, further comprising displaying a screen for guiding a change of the folding state into an unfolded state through the display device when the specific voice recording mode is an interview mode and the folding state information corresponds to the folding state.

15. An electronic device comprising:
a first housing structure comprising a first microphone;
a second housing structure comprising a second microphone, the second housing structure foldably coupled to the first housing structure;
a sensor module disposed in at least one of the first housing structure or the second housing structure; and
at least one processor disposed in the at least one of the first housing structure or the second housing structure and operationally connected with the first microphone, the second microphone, and the sensor module, the at least one processor configured to:
perform a recording operation by applying voice beamforming when a first voice recording mode is performed in an unfolded state of the electronic device,
receive a folding event related to the first housing structure and the second housing structure through the sensor module,
in response to receiving the folding event, identify folding state information, and
when the electronic device is identified as being in a folded state based on the folding state information, perform the recording operation without applying the voice beamforming,
wherein the at least one processor is further configured to control a recording function configuration to be changed from a voice beamforming function into a voice beamforming non-application function when a specific voice recording mode is an interview mode and the folding state information changes into the folded state from the unfolded state.

16. The electronic device of claim 15, wherein the first voice recording mode is the interview mode that records a voice directed at a conversation counterpart.

17. The electronic device of claim 15, wherein the folding event comprises an event occurring in correspondence to a change of a folding angle between the first housing structure and the second housing structure, and a distance between the first microphone and the second microphone is changed by a change of the folding angle.

18. The electronic device of claim 15, wherein the folding state information comprises the unfolded state of the electronic device, the folded state of the electronic device, and an intermediate state in which a folding angle between the first housing structure and the second housing structure is in a predetermined angle range.

19. The electronic device of claim 15, further comprising:
a display device,
wherein the at least one processor is further configured to control a screen for guiding a change of the folding state to be displayed through the display device when the folding state information satisfy a predetermined condition in the first voice recording mode.

* * * * *